United States Patent
Lei et al.

(10) Patent No.: US 11,638,306 B2
(45) Date of Patent: Apr. 25, 2023

(54) RANDOM ACCESS RESPONSE ENHANCEMENT FOR USER EQUIPMENTS WITH REDUCED CAPABILITIES

(71) Applicant: QUALCOMM Incorporated, San Diego, CA (US)

(72) Inventors: Jing Lei, San Diego, CA (US); Huilin Xu, San Diego, CA (US); Peter Pui Lok Ang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 17/124,411

(22) Filed: Dec. 16, 2020

(65) Prior Publication Data

US 2021/0195653 A1   Jun. 24, 2021

Related U.S. Application Data

(60) Provisional application No. 62/953,179, filed on Dec. 23, 2019.

(51) Int. Cl.
| | |
|---|---|
| *H04W 74/08* | (2009.01) |
| *H04W 72/04* | (2023.01) |
| *H04L 1/1867* | (2023.01) |

(52) U.S. Cl.
CPC ....... *H04W 74/0833* (2013.01); *H04L 1/1893* (2013.01); *H04W 72/0406* (2013.01)

(58) Field of Classification Search
CPC ......... H04W 74/0833; H04W 72/0406; H04W 72/042; H04W 72/0446; H04W 74/0866;
(Continued)

(56) References Cited

U.S. PATENT DOCUMENTS

| | | | |
|---|---|---|---|
| 2005/0014508 A1* | 1/2005 | Moulsley | H04W 74/002 455/450 |
| 2014/0086161 A1* | 3/2014 | Cai | H04W 72/042 370/329 |
| 2021/0126698 A1* | 4/2021 | Tsai | H04B 17/318 |

FOREIGN PATENT DOCUMENTS

WO   WO-2020092561 A1 *   5/2020   ........... H04B 7/1851

OTHER PUBLICATIONS

International Search Report and Written Opinion—PCT/US2020/065758—ISA/EPO—dated Mar. 22, 2021.
(Continued)

*Primary Examiner* — Thai Nguyen
(74) *Attorney, Agent, or Firm* — Loza & Loza LLP

(57) ABSTRACT

User equipments (UEs) with reduced capabilities may need a relaxed processing timeline relative to standard UEs. The relaxed processing timeline may provide UEs with reduced capabilities an appropriate amount of time (e.g., during a random access procedure) to decode messages from a base station (BS) and/or to prepare uplink messages. Aspects of the disclosure relate to a UE configured to transmit a message to a serving BS, the message including a request for timeline relaxation for transmission of a subsequent message, the message and the subsequent message being associated with a random access procedure. The UE may receive a response message associated with the random access procedure and indicating one or more timing offsets corresponding to the timeline relaxation. The UE may transmit the subsequent message to the serving BS based on the one or more timing offsets indicated by the serving BS. The subsequent message acknowledges the response message.

15 Claims, 22 Drawing Sheets

(58) Field of Classification Search
CPC ............ H04W 72/048; H04W 72/0413; H04L 1/1893; H04L 1/1858; H04L 5/0044; H04L 5/0053; H04L 5/0094; H04L 5/0007; H04L 5/0023; H04L 1/08; H04L 1/1671; H04L 1/1812; H04L 1/1854
See application file for complete search history.

(56) References Cited

OTHER PUBLICATIONS

Nokia, et al., "On 2-Step RACH Procedure", 3GPP Draft, 3GPP TSG RAN WG1 #97, R1-1906747, On 2-Step RACH Procedure, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728198, 23 Pages, Retrieved from the Internet: URL: http://www.3gpp.org/ftp/Meetings%5F3GPP%5FSYNC/RAN1/Docs/R1%2D1906747%2Ezip, [retrieved on May 13, 2019], Sections 1-2, Sections 2.1, 2.4, Sections 2.3-2.8, Sections 2.5, 2.6.3, 2.7, 2.7.1, Figures 6, 7, figures 1-8, tables 1-3, sections 1-3.

Nokia, et al., "Remaining Details of 2-Step RACH Procedure," 3GPP Draft, 3GPP TSG RAN WG1 #99, R1-1912558, 3rd Generation Partnership Project (3GPP), Mobile Competence Centre, 650, Route Des Lucioles, F-06921, Sophia-Antipolis Cedex, France, vol. RAN WG1, No. Reno, Nevada, US, Nov. 18, 2019-Nov. 22, 2019, Nov. 8, 2019 (Nov. 8, 2019), XP05182008, 31 pages, Retrieved from the Internet: URL: https://ftp.3gpp.org/tsg_ran/WG1_RL1/TSGR1_99/Docs/R1-1912558.zip [retrieved on Nov. 8, 2019] figures 1-8, tables 1-5, sections 1-3, Appendix A.

* cited by examiner

RANDOM ACCESS RESPONSE ENHANCEMENT FOR USER EQUIPMENTS WITH REDUCED CAPABILITIES

CROSS REFERENCE TO RELATED APPLICATION

This application claims the benefit of U.S. Provisional Application Ser. No. 62/953,179, entitled "RANDOM ACCESS RESPONSE ENHANCEMENT FOR USER EQUIPMENTS WITH REDUCED CAPABILITIES" and filed on Dec. 23, 2019, which is expressly incorporated by reference herein in its entirety.

TECHNICAL FIELD

The technology discussed below relates generally to wireless communication systems, and more particularly, to random access response (RAR) enhancement capabilities for user equipments (UEs) with reduced capabilities.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

User equipments (UEs) with reduced capabilities may include UEs having a reduced bandwidth, a reduced number of transmit/receive antennas, half-duplex frequency division duplex (FDD), a power class reduction (e.g., reduced transmission power), and/or a relaxed processing timeline/capability. An example of a UE with reduced capabilities may be a UE implemented as a surveillance camera with reduced wireless communication and/or processing capabilities.

UEs with reduced capabilities may need a relaxed processing timeline (e.g., relative to a processing timeline of standard UEs) in order to provide these UEs an appropriate amount of time to decode messages from a base station (e.g., messages of a random access procedure) and/or to prepare messages (e.g., messages of a random access procedure) to be transmitted to a base station. Moreover, uplink (UL) transmissions from UEs with reduced capabilities may be compromised (e.g., due to inadequate physical uplink control channel (PUCCH) coverage), which may significantly impair the performance and/or functionality of the UEs with reduced capabilities. The aspects described herein may enable a UE with reduced capabilities to trigger a timeline relaxation and/or a PUCCH coverage enhancement during a network access procedure to overcome the previously described issues and improve the performance of the UE.

In an aspect of the disclosure a method of wireless communication for a user equipment (UE) is provided. The UE transmits a message to a serving base station, the message including a request for timeline relaxation for transmission of a subsequent message, the message and the subsequent message being associated with a random access procedure. The UE receives a response message from the serving base station, the response message being associated with the random access procedure and indicating one or more timing offsets corresponding to the timeline relaxation. The UE transmits the subsequent message to the serving base station based on the one or more timing offsets indicated by the serving base station, wherein the subsequent message acknowledges the response message.

In an aspect of the disclosure, a method of wireless communication for a UE is provided. The UE transmits a first message or a third message of a random access procedure to a serving base station, the first message or the third message including a request for timeline relaxation for transmission of an acknowledgment message in the random access procedure. The UE receives a second message or a fourth message of the random access procedure from the serving base station, the second message or the fourth message indicating a timing offset corresponding to the timeline relaxation. The UE transmits the acknowledgement message on a physical uplink control channel (PUCCH) or a physical uplink shared channel (PUSCH) in response to the second message or fourth message of the random access procedure based on the timing offset.

In an aspect of the disclosure, a method of wireless communication for a user equipment (UE) is provided. The UE transmits a message of a random access procedure to a serving base station, the message including a request for a physical uplink control channel (PUCCH) coverage enhancement or a physical uplink shared channel (PUSCH) coverage enhancement. The UE receives, in response to the message, a response message of the random access procedure from the serving base station, the response message indicating at least one of a PUCCH format from an augmented lookup table (LUT) for PUCCH resource configuration, a PUCCH repetition level, or a frequency hopping pattern. The UE transmits a PUCCH signal based on at least one of the PUCCH format from the augmented lookup table (LUT) for PUCCH resource configuration, the PUCCH repetition level, or the frequency hopping pattern, or transmitting a PUSCH signal based on at least a PUSCH repetition level or the frequency hopping pattern.

In an aspect of the disclosure a method of wireless communication for a base station is provided. The base station receives a message from a UE, the message including a request for timeline relaxation for a subsequent message to be received from the UE, the message and the subsequent message being associated with a random access procedure, transmits a response message to the UE, the response message being associated with the random access procedure and indicating one or more timing offsets corresponding to the timeline relaxation, and receives the subsequent message from the UE based on the one or more timing offsets, wherein the subsequent message acknowledges the response message.

In an aspect of the disclosure a method of wireless communication for a base station is provided. The base station receives a first message or a third message of a random access procedure from a user equipment (UE), the first message or the third message including a request for timeline relaxation for reception of an acknowledgment message in the random access procedure, transmits a second message or a fourth message of the random access procedure to the UE, the second message or the fourth message indicating a timing offset corresponding to the timeline relaxation, and receives an acknowledgement message on a PUCCH or a PUSCH for the second message or the fourth message of the random access procedure based on the timing offset.

In an aspect of the disclosure a method of wireless communication for a base station is provided. The base station receives a message of a random access procedure from a user equipment (UE), the message including a request for a PUCCH coverage enhancement or a PUSCH coverage enhancement, transmits, in response to the message, a response message of the random access procedure to the UE, the response message indicating at least one of a PUCCH format from an augmented lookup table (LUT) for PUCCH resource configuration, a PUCCH repetition level, or a frequency hopping pattern, and receives a PUCCH signal based on at least one of the PUCCH format from the augmented lookup table (LUT) for PUCCH resource configuration, the PUCCH repetition level, or the frequency hopping pattern, or receives a PUSCH signal based on at least a PUSCH repetition level or the frequency hopping pattern.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In the aspects described herein, the term new radio (NR) generally refers to 5G technologies and the new radio access technology undergoing definition and standardization by 3GPP in Release 15.

Figure 1:
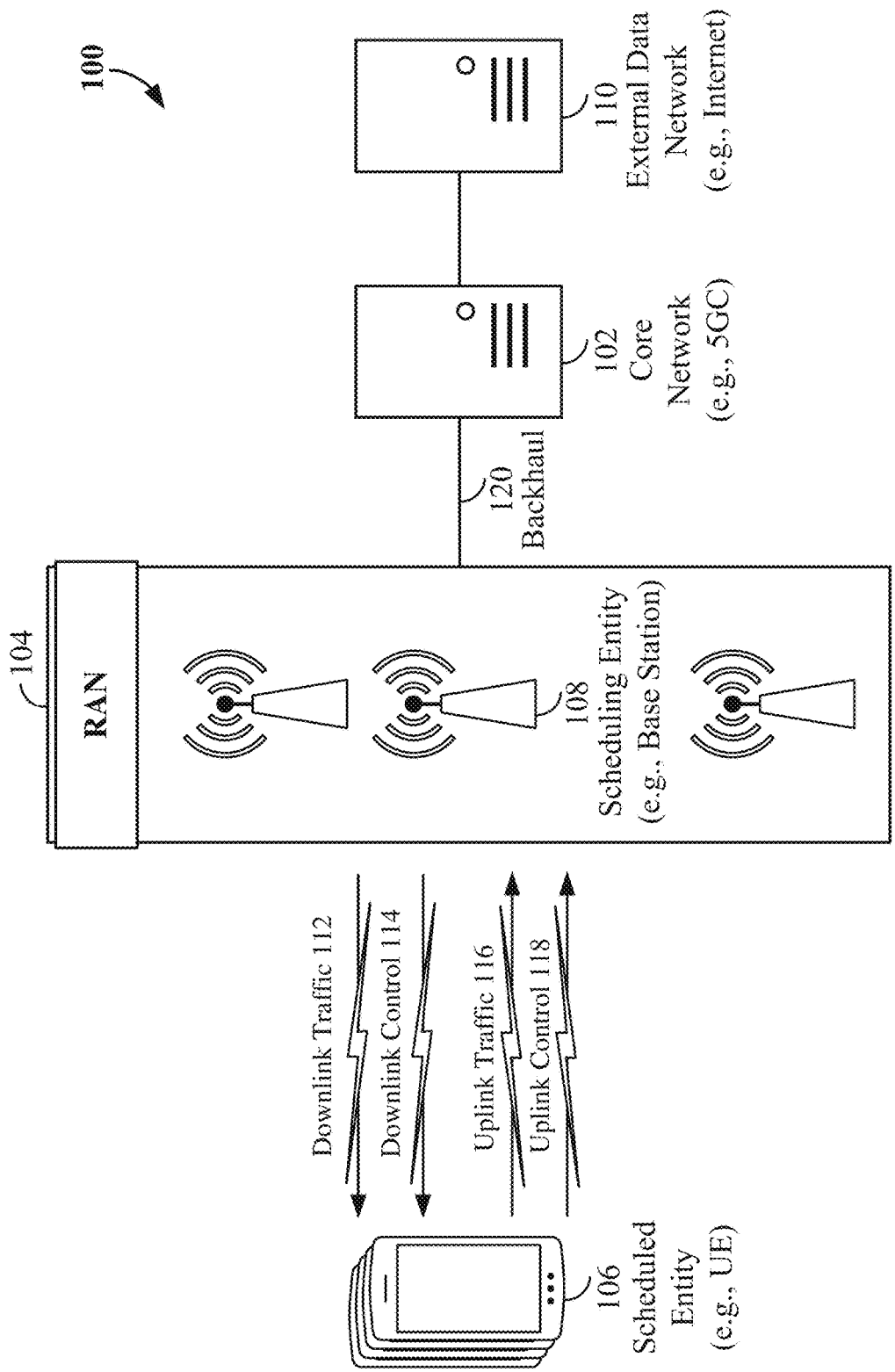
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a base station (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (described further below; e.g., UE 106).

In some examples, access to the air interface may be scheduled, wherein a base station (e.g., a base station 108) allocates resources for communication among some or all devices and equipment within its service area or cell. Within the present disclosure, as discussed further below, the base station may be responsible for scheduling, assigning, reconfiguring, and releasing resources for one or more scheduled entities. That is, for scheduled communication, UEs 106, which may be scheduled entities, may utilize resources allocated by the base station 108.

Base stations 108 are not the only entities that may function as scheduling entities. That is, in some examples, a UE may function as a base station, scheduling resources for one or more UEs.

As illustrated in FIG. 1, a base station 108 may broadcast downlink traffic 112 to one or more scheduled entities 106. Broadly, the base station 108 is a node or device responsible for scheduling traffic in a wireless communication network, including the downlink traffic 112 and, in some examples, uplink traffic 116 from one or more scheduled entities 106 to the base station 108. On the other hand, the UE 106 is a node or device that receives downlink control information 114, including but not limited to scheduling information (e.g., a grant), synchronization or timing information, or other control information from another entity in the wireless communication network such as the base station 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
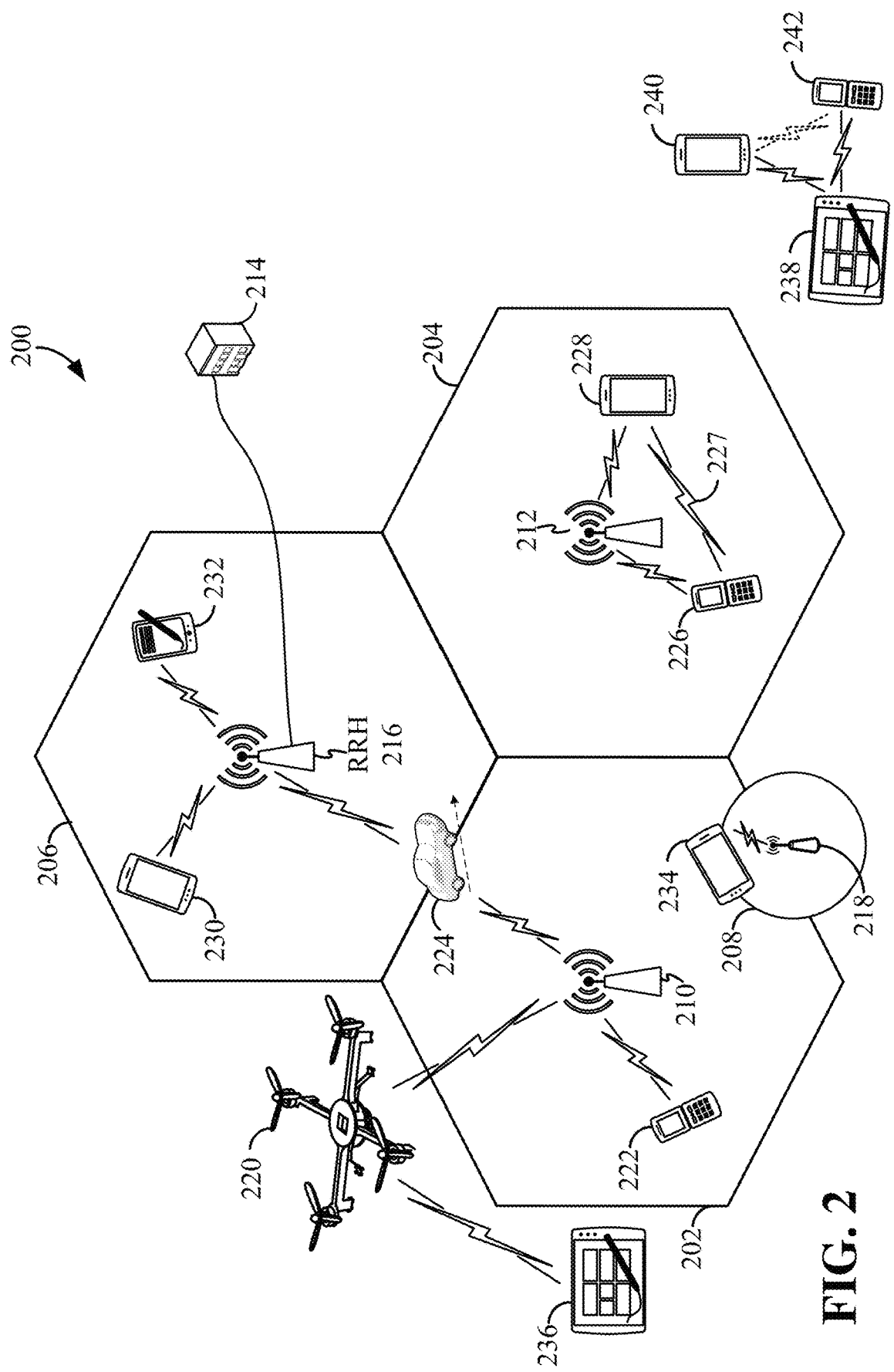
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/base station 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a base station or a primary sidelink device, and UEs 240 and 242 may function as a UE or a non-primary (e.g., secondary) sidelink device. In still another example, a UE may function as a base station in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the base station 238. Thus, in a wireless communication system with scheduled access to time—frequency resources and having a cellular configuration, a P2P configuration, or a mesh configuration, a base station and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a base station, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
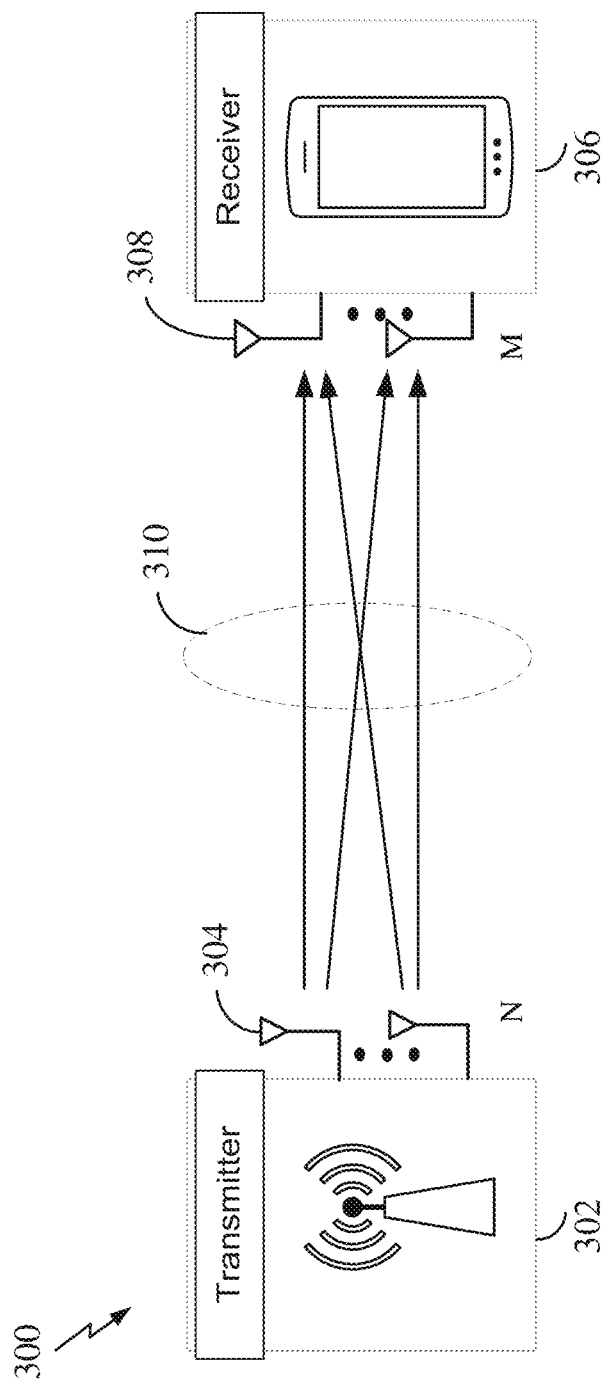
FIG. 3 is a block diagram illustrating a wireless communication system supporting multiple-input multiple-output (MIMO) communication.

In some aspects of the disclosure, the base station and/or UE may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a base station 108, a UE 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time—frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
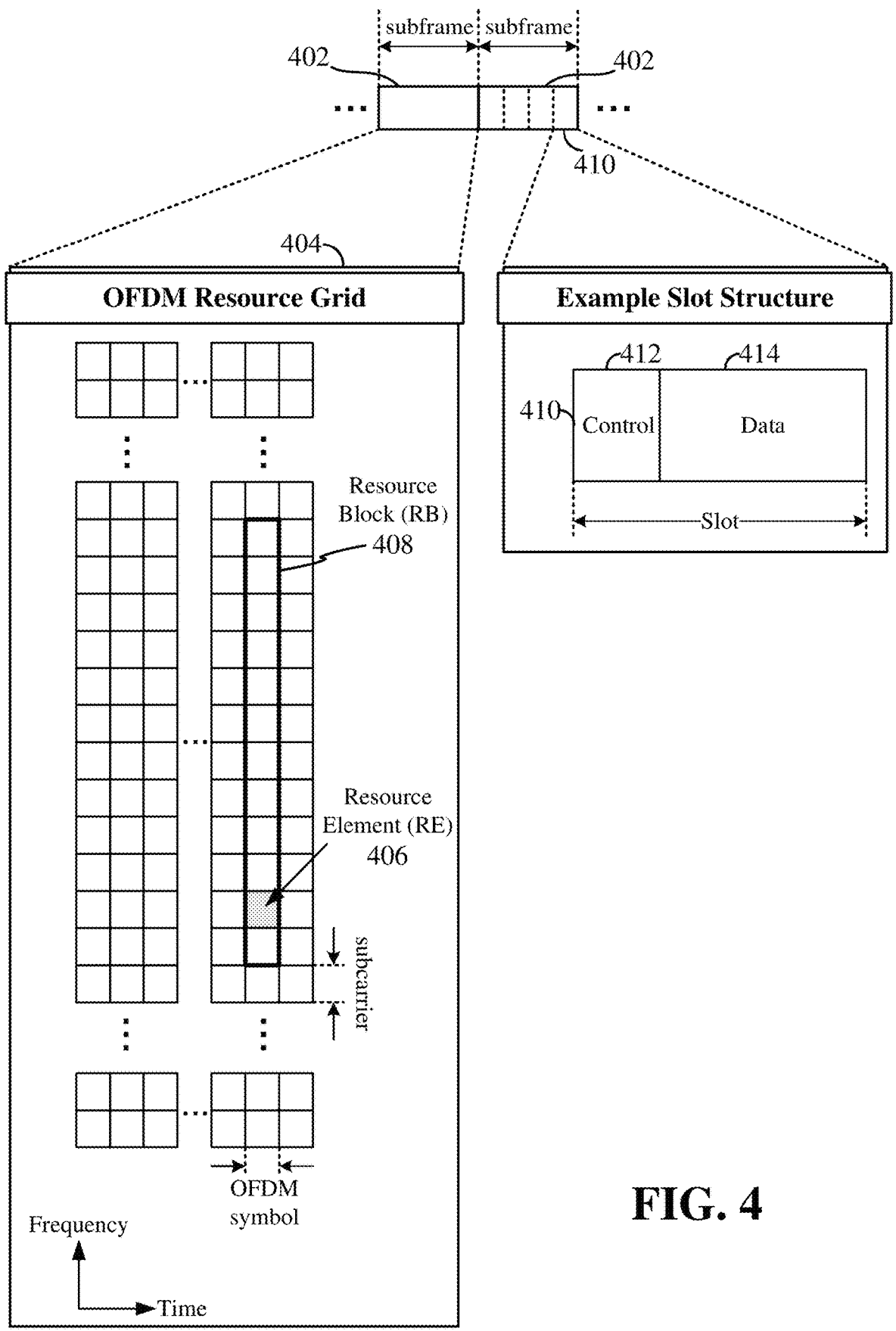
FIG. 4 is a schematic illustration of an organization of wireless resources in an air interface utilizing orthogonal frequency divisional multiplexing (OFDM) according to some embodiments.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the base station 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block (SSB) that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a UE 106) may utilize one or more REs 406 to carry UL control information 118 (UCI). The UCI can originate from higher layers via one or more UL control channels, such as a physical uplink control channel (PUCCH), a physical random access channel (PRACH), etc., to the base station 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the base station 108 to schedule uplink transmissions. Here, in response to the SR transmitted on the control channel 118, the base station 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a base station 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

Figure 5:
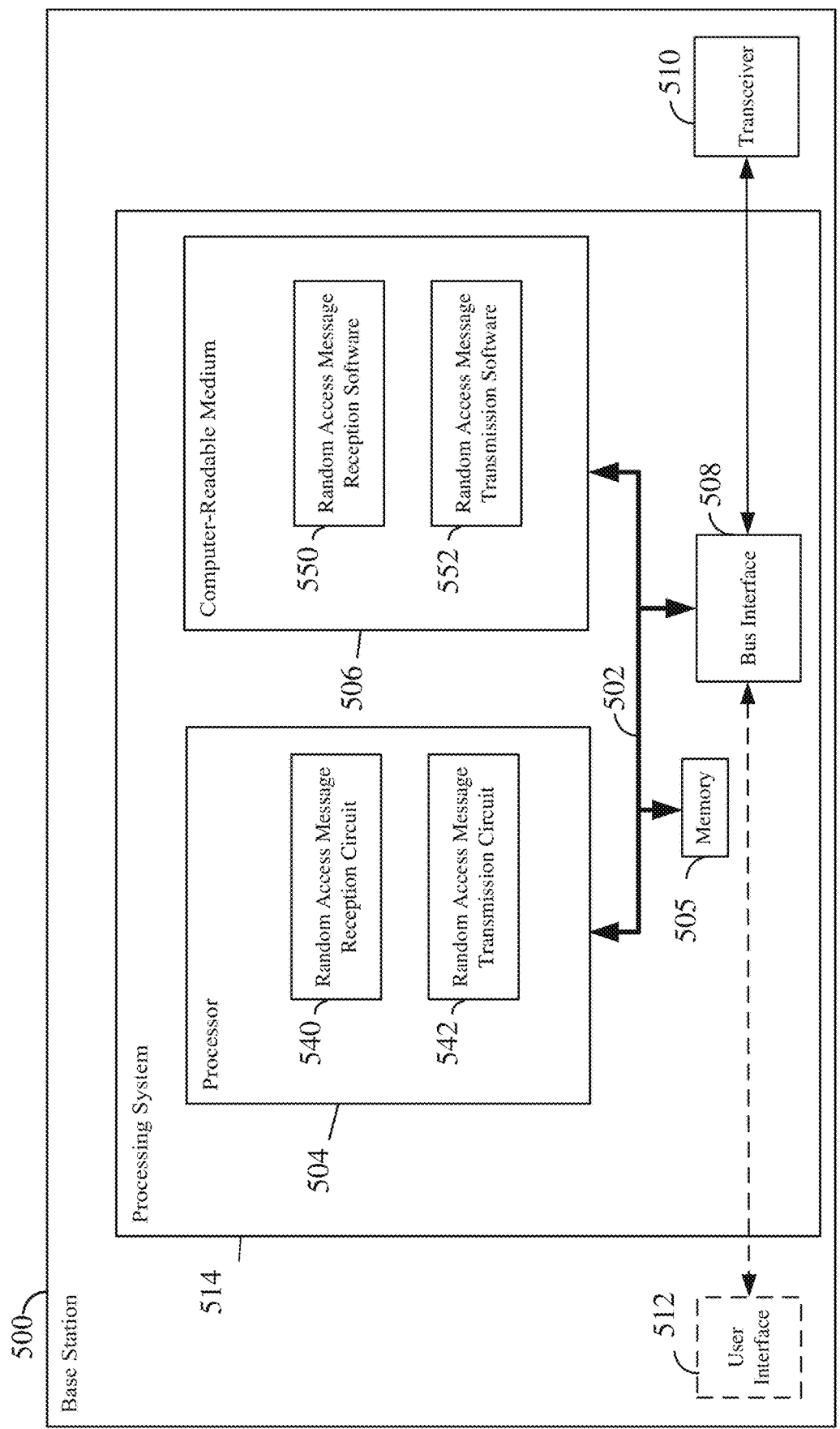
FIG. 5 is a block diagram conceptually illustrating an example of a hardware implementation for a base station according to some aspects of the disclosure.

FIG. 5 is a block diagram illustrating an example of a hardware implementation for a base station 500 (also herein referred to as a serving base station 500) employing a processing system 514. For example, the base station 500 may be any one of the base stations illustrated in FIGS. 1, 2, and/or 3.

The base station 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 500 may be configured to perform any one or more of the functions described herein. That is, the processor 504, as utilized in a base station 500, may be used to implement any one or more of the processes and procedures described herein.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided. Of course, such a user interface 512 is optional, and may be omitted in some examples, such as a base station.

In some aspects of the disclosure, the processor 504 may include circuitry configured for the various functions described herein. For example, the processor 504 may include random access message reception circuitry 540 configured to receive a message from a user equipment (UE), the message including a request for timeline relaxation for a subsequent message to be received from the UE, the message and the subsequent message being associated with a random access procedure, receive the subsequent message from the UE based on the one or more timing offsets, wherein the subsequent message acknowledges the response message, receive a first message or a third message of a random access procedure from a user equipment, the first message or the third message including a request for timeline relaxation for reception of an acknowledgment message in the random access procedure, receive an acknowledgement message on a physical uplink control channel (PUCCH) or a physical uplink shared channel (PUSCH) for the second message or fourth message of the random access procedure based on the timing offset, receive a message of a random access procedure from a user equipment, the message including a request for a PUCCH coverage enhancement or a PUSCH coverage enhancement, and/or receive a PUCCH signal based on at least one of a PUCCH format from an augmented lookup table (LUT) for PUCCH resource configuration, a PUCCH repetition level, or a frequency hopping pattern, or receive a PUSCH signal based on at least a PUSCH repetition level or the frequency hopping pattern.

The processor 504 may further include random access message transmission circuitry 542 configured to transmit a response message to the UE, the response message being associated with the random access procedure and indicating one or more timing offsets corresponding to the timeline relaxation, transmit a second message or a fourth message of the random access procedure to the user equipment, the second message or the fourth message indicating a timing offset corresponding to the timeline relaxation, and/or transmit, in response to the message, a response message of the random access procedure to the user equipment, the response message indicating at least one of a PUCCH format from an augmented lookup table (LUT) for PUCCH resource configuration, a PUCCH repetition level, or a frequency hopping pattern.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RANI), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may include software configured for the various functions described herein. For example, the computer-readable storage medium 506 may include random access message reception software 550 configured to receive a message from a user equipment (UE), the message including a request for timeline relaxation for a subsequent message to be received from the UE, the message and the subsequent message being associated with a random access procedure, receive the subsequent message from the UE based on the one or more timing offsets, wherein the subsequent message acknowledges the response message, receive a first message or a third message of a random access procedure from a user equipment, the first message or the third message including a request for timeline relaxation for reception of an acknowledgment message in the random access procedure, receive an acknowledgement message on a physical uplink control channel (PUCCH) or a physical uplink shared channel (PUSCH) for the second message or fourth message of the random access procedure based on the timing offset, receive a message of a random access procedure from a user equipment, the message including a request for a PUCCH coverage enhancement or a PUSCH coverage enhancement, and/or receive a PUCCH signal based on at least one of the PUCCH format from the augmented lookup table (LUT) for PUCCH resource configuration, the PUCCH repetition level, or the frequency hopping pattern, or receive a PUSCH signal based on at least a PUSCH repetition level or the frequency hopping pattern.

The computer-readable storage medium 506 may further include random access message transmission software 552 configured to transmit a response message to the UE, the response message being associated with the random access procedure and indicating one or more timing offsets corresponding to the timeline relaxation, transmit a second message or a fourth message of the random access procedure to the user equipment, the second message or the fourth message indicating a timing offset corresponding to the timeline relaxation, and/or transmit, in response to the message, a response message of the random access procedure to the user equipment, the response message indicating at least one of a PUCCH format from an augmented lookup table (LUT) for PUCCH resource configuration, a PUCCH repetition level, or a frequency hopping pattern.

Figure 6:
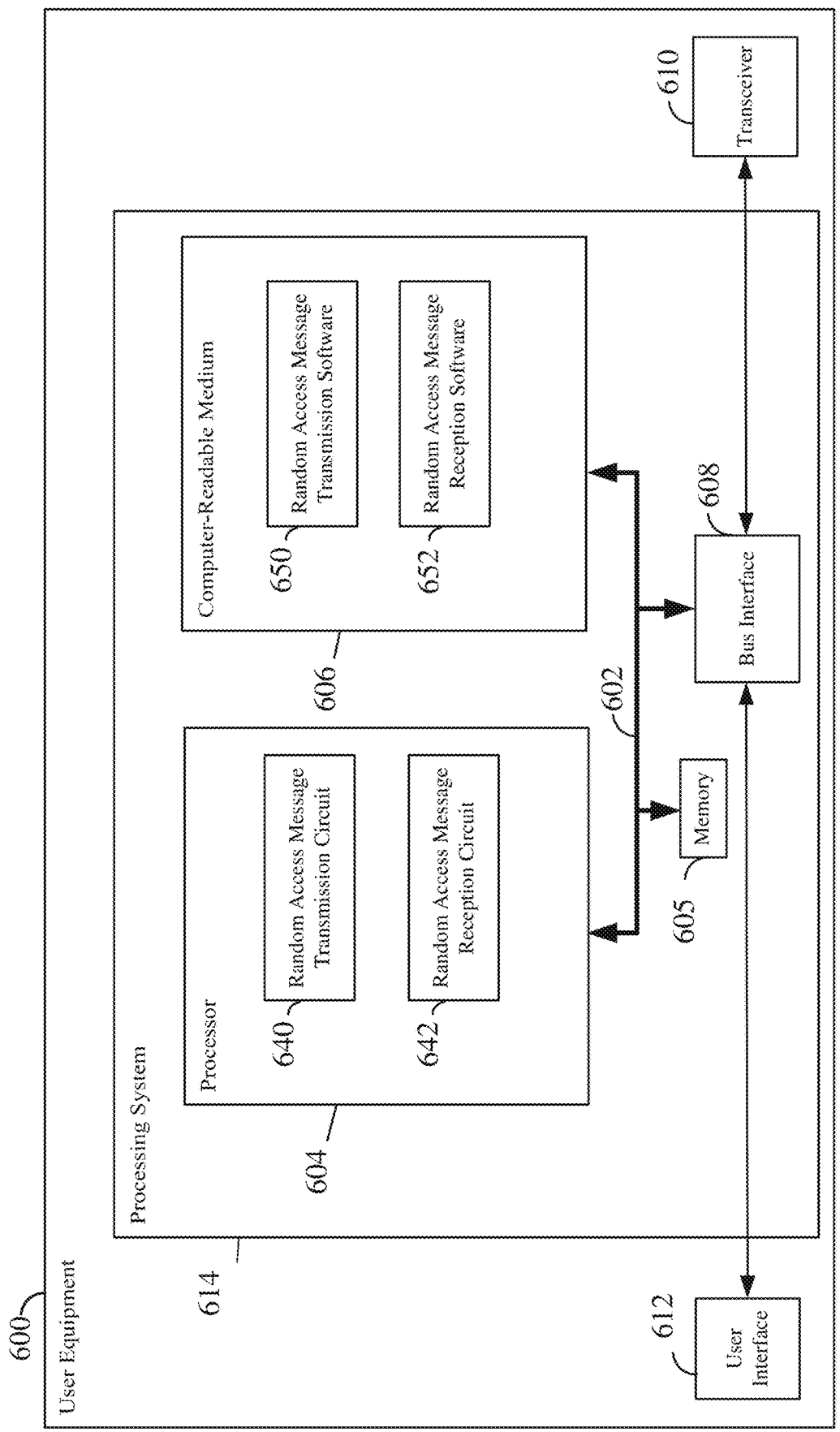
FIG. 6 is a block diagram conceptually illustrating an example of a hardware implementation for a user equipment (UE) according to some aspects of the disclosure.

FIG. 6 is a conceptual diagram illustrating an example of a hardware implementation for an exemplary user equipment (UE) 600 employing a processing system 614. In accordance with various aspects of the disclosure, an element, or any portion of an element, or any combination of elements may be implemented with a processing system 614 that includes one or more processors 604. For example, the UE 600 may be any one of the UEs illustrated in FIGS. 1, 2, and/or 3.

The processing system 614 may be substantially the same as the processing system 514 illustrated in FIG. 5, including a bus interface 608, a bus 602, memory 605, a processor 604, and a computer-readable medium 606. Furthermore, the UE 600 may include a user interface 612 and a transceiver 610 substantially similar to those described above in FIG. 5. That is, the processor 604, as utilized in a UE 600, may be used to implement any one or more of the processes described below and illustrated in FIGS. 17-19.

In some aspects of the disclosure, the processor 604 may include circuitry configured for the various functions described herein. For example, the processor 604 may include random access message transmission circuitry 640 configured to transmit a message to a serving base station, the message including a request for timeline relaxation for transmission of a subsequent message, the message and the subsequent message being associated with a random access procedure, transmit the subsequent message to the serving base station based on the one or more timing offsets indicated by the serving base station, wherein the subsequent message acknowledges the response message, transmit a first message or a third message of a random access procedure to a serving base station, the first message or the third message including a request for timeline relaxation for transmission of an acknowledgment message in the random access procedure, transmit the acknowledgement message on a physical uplink control channel (PUCCH) or a physical uplink shared channel (PUSCH) in response to the second message or fourth message of the random access procedure based on the timing offset, transmit a message of a random access procedure to a serving base station, the message including a request for a physical uplink control channel (PUCCH) coverage enhancement or a physical uplink data channel (PUSCH) coverage enhancement, and/or transmit a PUCCH signal based on at least one of the PUCCH format from the augmented lookup table (LUT) for PUCCH resource configuration, the PUCCH repetition level, or the frequency hopping pattern, or transmit a PUSCH signal based on at least a PUSCH repetition level or the frequency hopping pattern.

The processor 604 may include random access message reception circuitry 642 configured to receive a response message from the serving base station, the response message being associated with the random access procedure and indicating one or more timing offsets corresponding to the timeline relaxation, receive a second message or a fourth message of the random access procedure from the serving base station, the second message or the fourth message indicating a timing offset corresponding to the timeline relaxation, and/or receive, in response to the message, a response message of the random access procedure from the serving base station, the response message indicating at least one of a PUCCH format from an augmented lookup table (LUT) for PUCCH resource configuration, a PUCCH repetition level, or a frequency hopping pattern.

In one or more examples, the computer-readable storage medium 606 may include software configured for the various functions described below in relation to FIGS. 17-19 described herein. For example, the computer-readable storage medium 606 may include random access message transmission software 650 configured to transmit a message to a serving base station, the message including a request for timeline relaxation for transmission of a subsequent message, the message and the subsequent message being associated with a random access procedure, transmit the subsequent message to the serving base station based on the one or more timing offsets indicated by the serving base station, wherein the subsequent message acknowledges the response message, transmit a first message or a third message of a random access procedure to a serving base station, the first message or the third message including a request for timeline relaxation for transmission of an acknowledgment message in the random access procedure, transmit the acknowledgement message on a physical uplink control channel (PUCCH) or a physical uplink shared channel (PUSCH) in response to the second message or fourth message of the random access procedure based on the timing offset, transmit a message of a random access procedure to a serving base station, the message including a request for a physical uplink control channel (PUCCH) coverage enhancement or a physical uplink data channel (PUSCH) coverage enhancement, and/or transmit a PUCCH signal based on at least one of the PUCCH format from the augmented lookup table (LUT) for PUCCH resource configuration, the PUCCH repetition level, or the frequency hopping pattern, or transmit a PUSCH signal based on at least a PUSCH repetition level or the frequency hopping pattern.

For example, the computer-readable storage medium 606 may include random access message reception software 652 configured to receive a response message from the serving base station, the response message being associated with the random access procedure and indicating one or more timing offsets corresponding to the timeline relaxation, receive a second message or a fourth message of the random access procedure from the serving base station, the second message or the fourth message indicating a timing offset corresponding to the timeline relaxation, and/or receive, in response to the message, a response message of the random access procedure from the serving base station, the response message indicating at least one of a PUCCH format from an augmented lookup table (LUT) for PUCCH resource configuration, a PUCCH repetition level, or a frequency hopping pattern.

Figure 7:
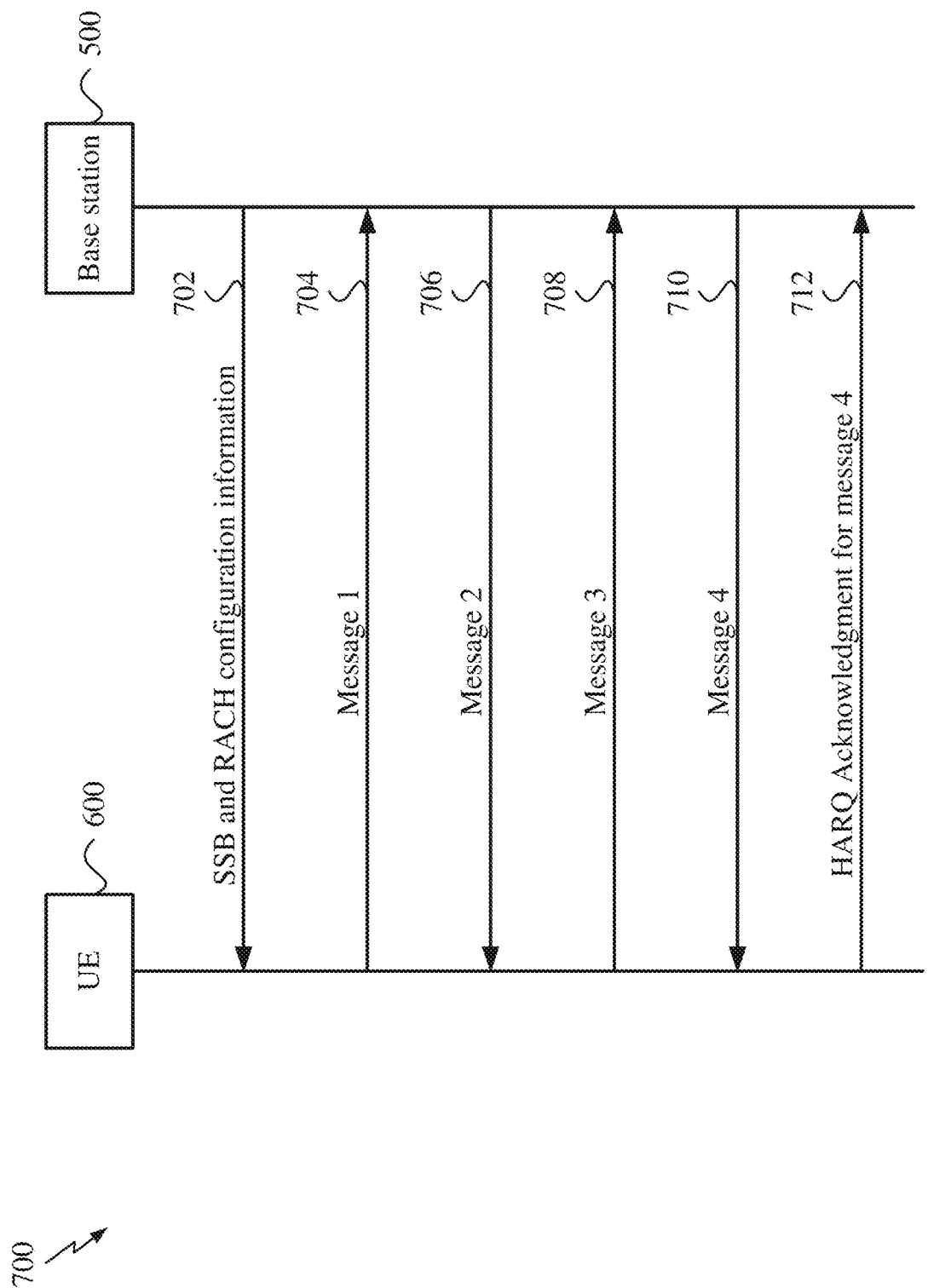
FIG. 7 is a signal flow diagram illustrating an example 4-step random access (RA) procedure performed between a UE and a base station.

FIG. 7 is a signal flow diagram illustrating an example 4-step random access (RA) procedure 700 performed between a UE (e.g., UE 600) and a base station (e.g., base station 500). The 4-step RA procedure 700 may be a contention based random access procedure (CBRA) and may be initiated by the UE 600 for initial access to the network (e.g., to achieve UL synchronization with the base station 500). As shown in FIG. 7, the UE 600 may receive cell detection information 702 from the base station 500. In some aspects of the disclosure, the cell detection information 702 may include an SSB and random access channel (RACH) configuration information.

The UE 600 may initiate the 4-step RA procedure 700 by transmitting a PRACH preamble in message 1 (Msg1) 704. Upon detection of the PRACH preamble, the base station 500 responds with a message 2 (Msg2) 706 including a random access response (RAR). The base station 500 may use a PDCCH for scheduling and a PDSCH for transmitting the message 2 706. The RAR may include a UL grant for transmission of a message 3 (Msg3) 708 by the UE 600 using a PUSCH. The base station 500 may transmit a contention resolution via a message 4 (Msg4) 710 using the PDCCH for scheduling and the PDSCH for transmitting the message 4 710. The UE 600 may acknowledge the message 4 710 with a HARQ acknowledgement (ACK) message 712 using a PUCCH.

Figure 8:
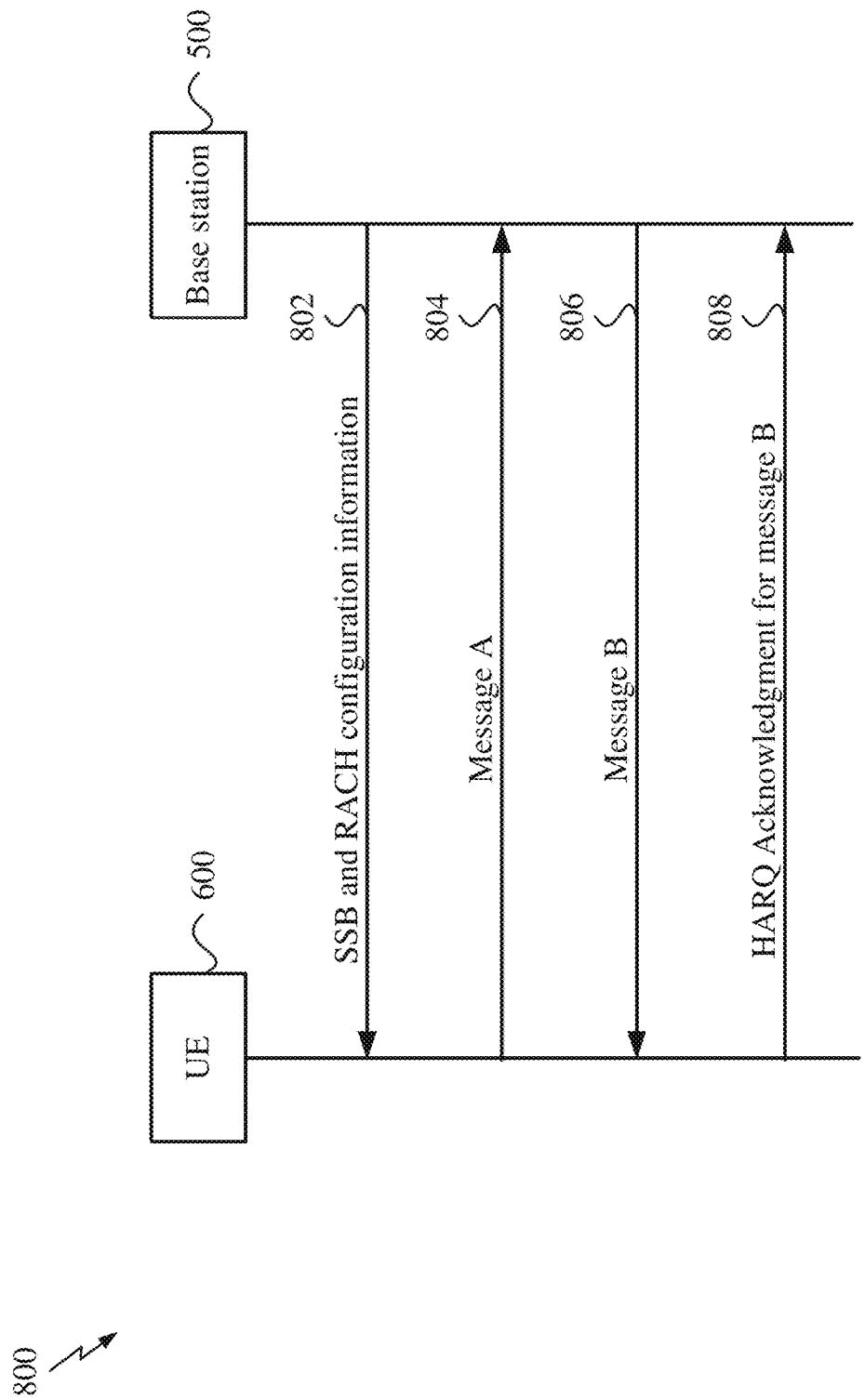
FIG. 8 is a signal flow diagram illustrating an example 2-step random access (RA) procedure performed between a UE and a base station.

FIG. 8 is a signal flow diagram illustrating an example 2-step random access (RA) procedure 800 performed between a UE (e.g., UE 600) and a base station (e.g., base station 500). The 2-step RA procedure 800 may be a contention based random access procedure (CBRA) and may be initiated by the UE 600 for initial access to the network (e.g., to achieve UL synchronization with the base station 500). As shown in FIG. 8, the UE 600 may receive cell detection information 802 from the base station 500. In some aspects of the disclosure, the cell detection information 802 may include an SSB and RACH configuration information.

The UE 600 may initiate the 2-step RA procedure 800 by transmitting a message A (MsgA) 804 to the base station 500. The message A 804 may include a PRACH preamble and may be transmitted using a PUSCH. The base station 500 responds by transmitting a message B (MsgB) 806, which may include a contention resolution and timing advance information, using a PDCCH for scheduling and a PDSCH for transmitting the message B 806. The UE 600 may acknowledge the message B 806 with a HARQ acknowledgement (ACK) message 808 using a PUCCH.

Figure 9:
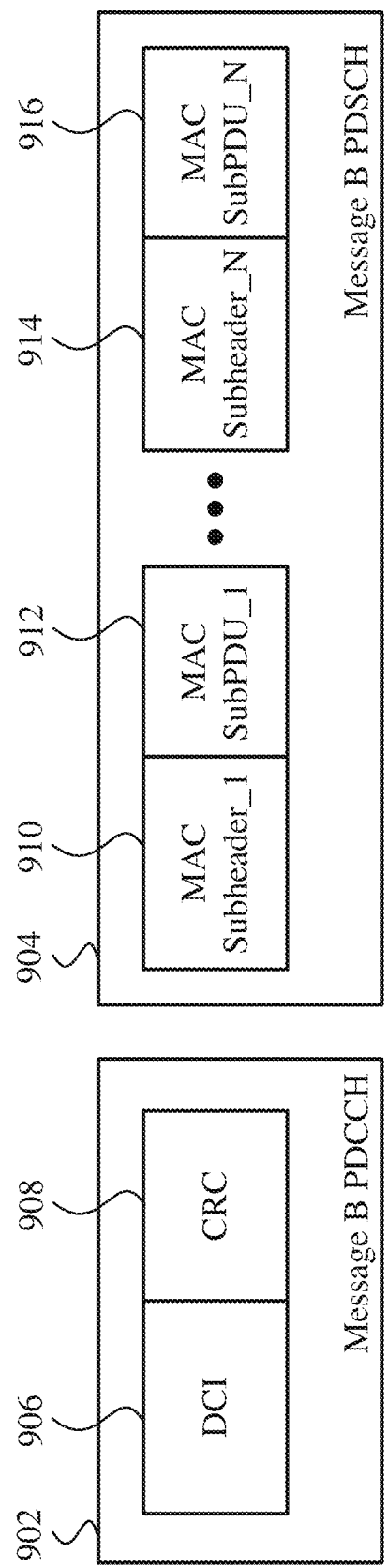
FIG. 9 is a diagram illustrating the physical downlink control channel (PDCCH) and physical downlink shared channel (PDSCH) components of an example message B transmission in a 2-step random access (RA) procedure.

FIG. 9 is a diagram illustrating the PDCCH and PDSCH components of an example message B transmission (e.g., the message B 806) in a 2-step random access (RA) procedure. As shown in FIG. 9, a message B PDCCH transmission 902 may include downlink control information (DCI) 906 followed by a cyclic redundancy check (CRC) 908. For example, the CRC 908 may be based on the message B radio network temporary identifier (RNTI) or the message B cell RNTI (C-RNTI). The DCI 906 may schedule the message B PDSCH transmission 904 described below.

As shown in FIG. 9, a message B PDSCH transmission 904 may include one or more MAC subheaders and corresponding MAC sub protocol data units (subPDUs). For example, the message B PDSCH transmission 904 may include a first MAC subheader (MAC Subheader_1) 910 and a corresponding first MAC subPDU (SubPDU_1) 912, and an Nth MAC subheader (MAC Subheader_N) 914 and a corresponding Nth MAC SubPDU (SubPDU_N) 916.

Figure 10:
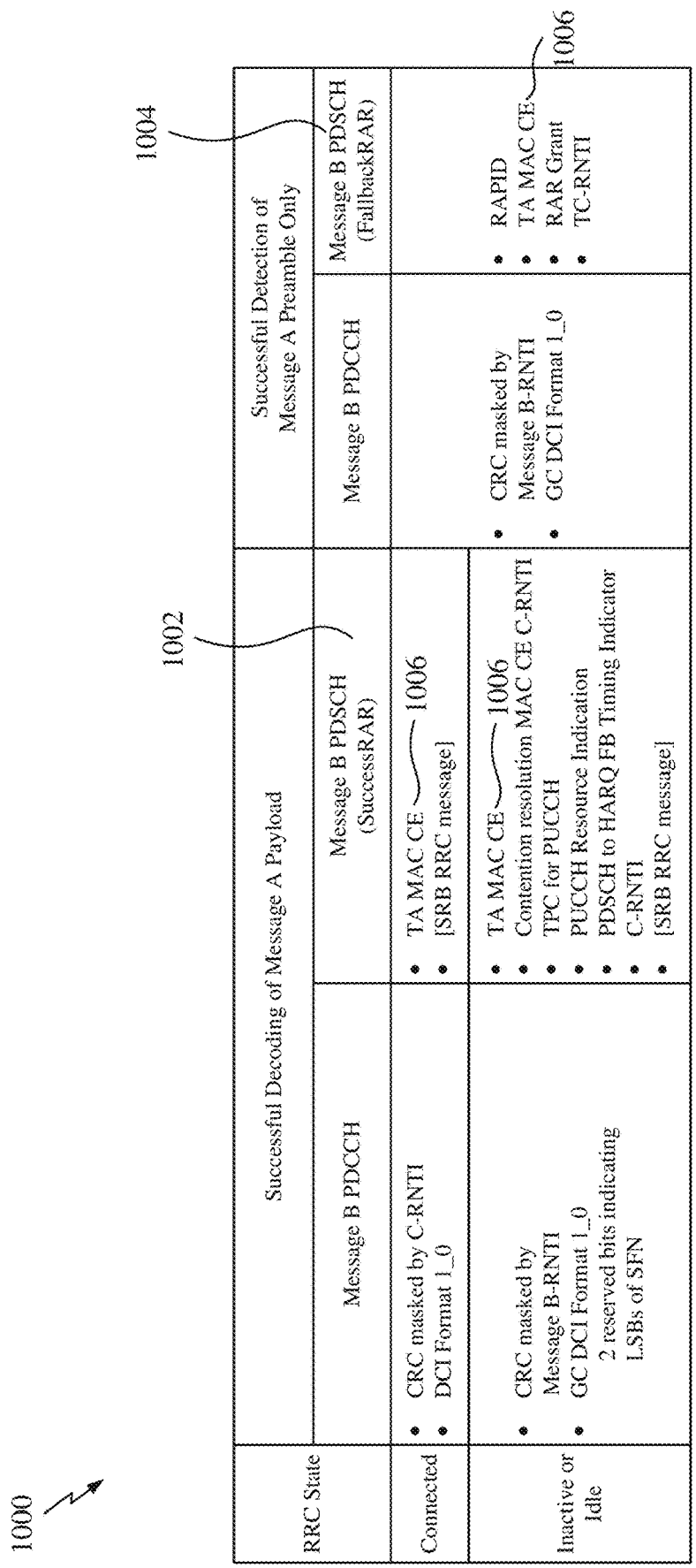
FIG. 10 illustrates a table that describes the contents of a message B of a 2-step random access (RA) procedure.

FIG. 10 illustrates a table 1000 that describes the contents of a message B (e.g., the message B 806) of a 2-step random access (RA) procedure. As shown in table 1000, the contents of a message B random access response (RAR) may depend on the outcome of the processing of a message A at the base station 500 and the radio resource connection (RRC) state of the UE 600.

For UEs sharing the same RACH occasion (RO), different types of RARs may be transmitted by the base station 500. For example, the different types of RARs may include a SuccessRAR 1002, a FallbackRAR 1004, and a Back-off Indicator. In some examples, the base station 500 may aggregate multiple RARs of different UEs in a single message B PDSCH transmission. In some examples, the base station 500 may include a timing advance (TA) MAC control element (CE) 1006 in a FallbackRAR and a SuccessRAR. A UE (e.g., the UE 600) may identify its RAR within a message B PDSCH transmission based on the contents of the MAC subheader and the contents of the MAC subPDU. A message B PDCCH of a 2-step RA procedure and a message 2 PDCCH of a 4-step RA procedure may be distinguished by different RNTIs.

Figure 11:
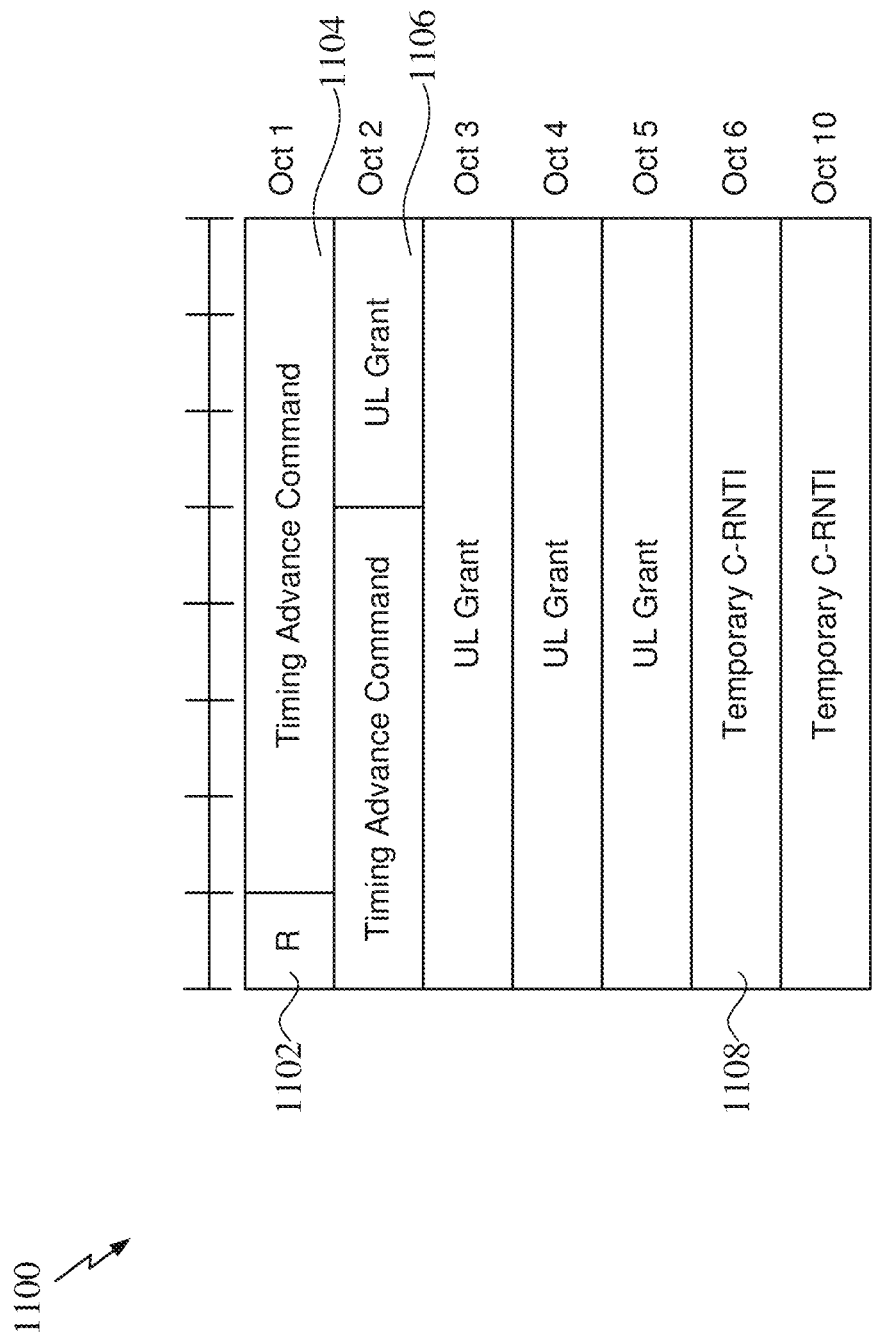
FIG. 11 illustrates an example format of a media access control (MAC) random access response (RAR) 1100 for a message 2 in a 4-step RA procedure.

FIG. 11 illustrates an example format of a media access control (MAC) random access response (RAR) 1100 for a message 2 (e.g., the message 2 706) in a 4-step RA procedure. As shown in FIG. 11, the MAC RAR 1100 may include a single bit (reserved) field 1102, a 12-bit timing advance command field 1104, a 27-bit UL grant field 1106, and a 16-bit temporary C-RNTI field 1108.

Figure 12:
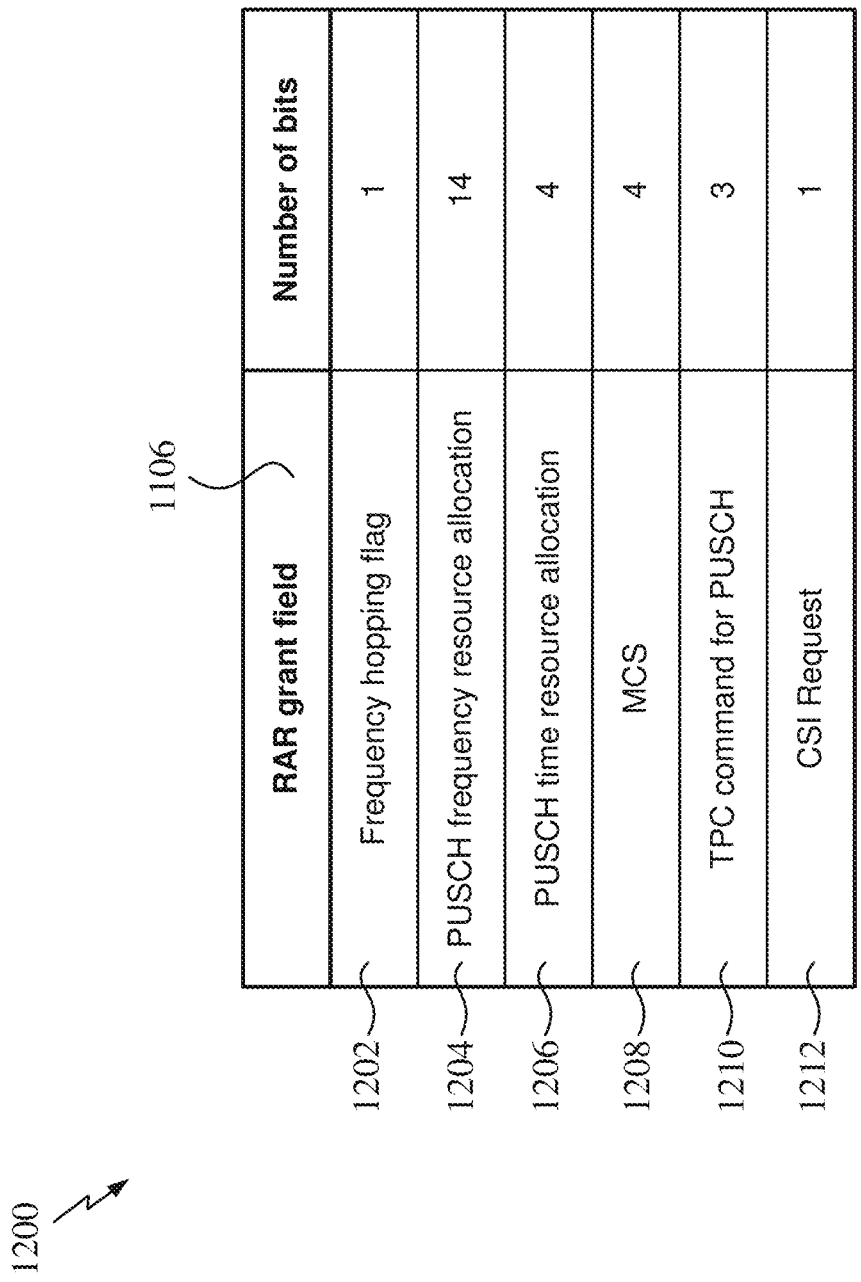
FIG. 12 is a table showing an example allocation of the bits in the UL grant field in the example format of the MAC RAR shown in FIG. 11.

FIG. 12 illustrates a table 1200 showing an example allocation of the bits in the UL grant field 1106 in the example format of the MAC RAR 1100 shown in FIG. 11. As shown in FIG. 12, the RAR grant field 1106 may include one bit for a frequency hopping flag 1202, 14 bits for a PUSCH frequency resource allocation 1204, four bits for a PUSCH time resource allocation 1206, four bits for a modulation and coding scheme (MCS) 1208, three bits for a transmit power control (TPC) command for PUSCH 1210, and one bit for a channel state information (CSI) request 1212.

UE Processing Timeline Relaxation

Figure 13:
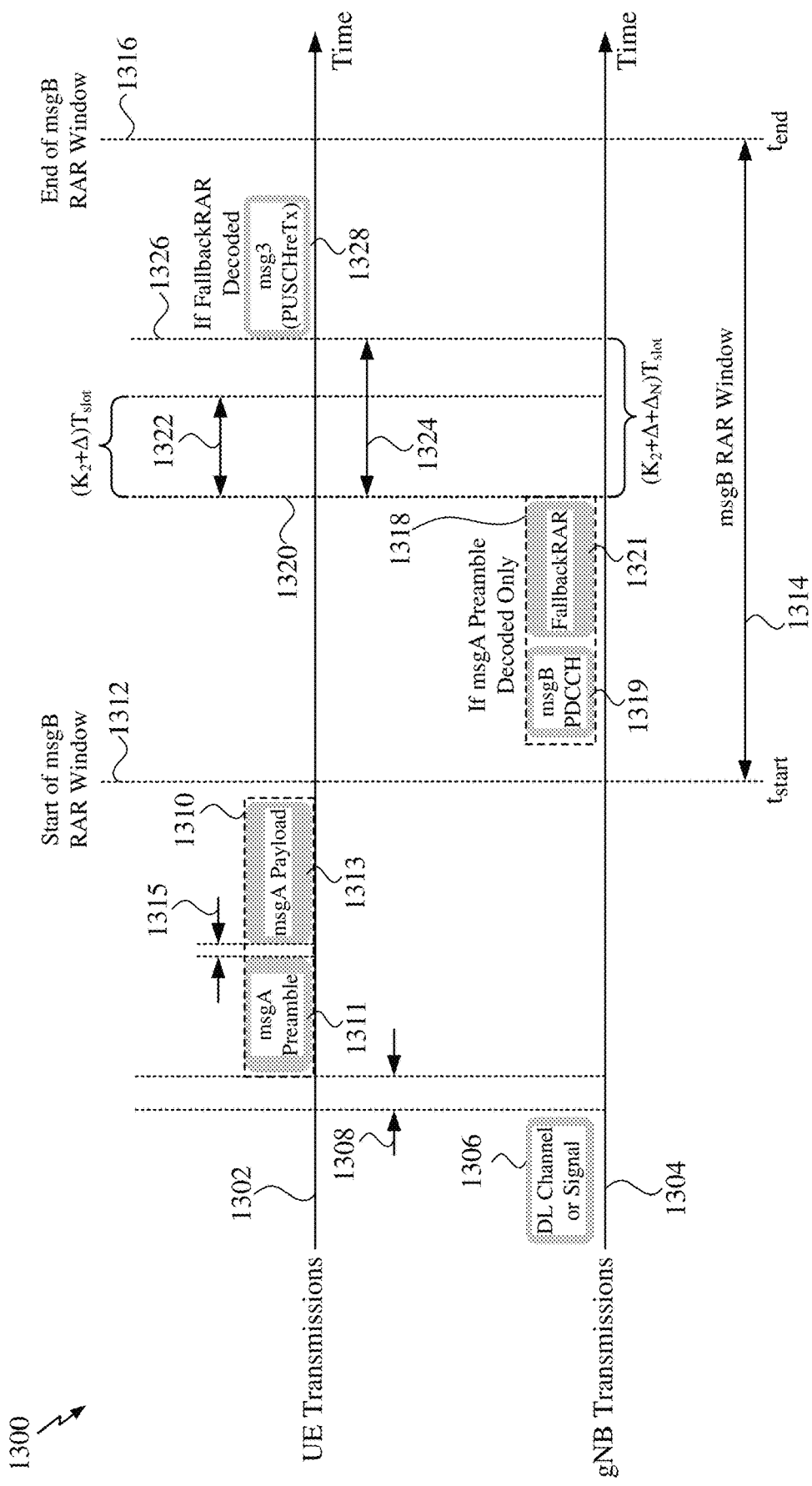
FIG. 13 includes a diagram illustrating an example timeline relaxation for a message 3 of a 4-step random access procedure or a 2-step random access procedure.

FIG. 13 includes a diagram 1300 illustrating an example UE processing timeline relaxation (also referred to as a UE timeline relaxation) for a 2-step random access procedure. UE processing timeline relaxation may refer to an increase of a time period within which a UE is to process (e.g., decode) a downlink message of a random access procedure from a base station and prepare an uplink message of the random access procedure for transmission to the base station.

The UE transmissions in FIG. 13 may be from a UE with reduced capabilities (e.g., the UE 600 described herein). For example, a UE with reduced capabilities may have a reduced bandwidth, a reduced number of transmit/receive antennas, half-duplex FDD, a power class reduction, and/or a relaxed processing timeline/capability. It should be noted that in the case of a 2-step random access procedure, if the serving base station cannot decode message A, a fallback to the 4-step random access procedure is performed by transmitting a fallback random access response (also referred to as a FallbackRAR) to the UE. Upon successfully decoding the FallbackRAR, the UE may transmit a message 3 on PUSCH.

In FIG. 13, the transmissions from the UE are shown above the UE message transmission timeline 1302 and the transmissions from the base station (referred to as gNB in FIG. 13) are shown above the base station message transmission timeline 1304. The base station may initially transmit information on a downlink channel 1306, which may be used by the UE to transmit a message A (MsgA) 1310 of a 2-step random access procedure (or a message 1 of a 4-step random access procedure) after a period 1308 (also referred to as an $N_{gap}$). The message A 1310 may include a PRACH preamble 1311 and a payload 1313 transmitted on PUSCH. The payload 1313 may be transmitted a period 1315 (also referred to as a gap N) after the transmission of the PRACH preamble 1311.

In some aspects of the disclosure, if the UE has reduced capability (e.g., a UE implemented as a surveillance camera with reduced wireless communication capabilities), the UE may trigger a timeline relaxation by including a request for a timeline relaxation in the message A 1310 (or in message 1 in the case of a 4-step random access procedure). For example, the UE may trigger the timeline relaxation because during a contention based random access procedure or a contention free random access procedure, the base station may not be aware that the UE is a low capability UE in need of a relaxed processing timeline as described herein. In some aspects, if the UE is to perform a contention free random access procedure, the UE may report its reduced capability (before performing a contention free random access procedure) instead of including the request for a timeline relaxation in the message A 1310.

With reference to FIG. 13, after the start time $t_{start}$ 1312 of the message B RAR window 1314, if the base station was able to detect only the PRACH preamble transmitted by the UE, the base station may respond by transmitting a message B (MsgB) 1318 including a FallbackRAR (or by transmitting a message 2 in the case of a 4-step random access procedure). The base station may transmit the message B 1318 using PDCCH 1319 for scheduling and PDSCH for transmitting the payload 1321 of the message B 1318. In some aspects of the disclosure, the base station may include an indication of relaxed timing in the message B (MsgB) 1318 (or in the message 2 in the case of a 4-step random access procedure).

As shown in FIG. 13, the timeline for transmission of the message 3 (msg3) 1328 may be determined by the first period 1322 or the second period 1324. The first period 1322 may begin when the UE has received the message B 1318 (e.g., at time 1320) and may be defined by the expression $K_2+\Delta$, where the result of the expression $K_2+\Delta$ represents a number of slots (referred to as a slot offset). In one aspect of the disclosure, one or more new look lookup tables (LUTs) for setting new values of $K_2$ (e.g., new values of $K_2$ that are not available using existing LUTs in Release 16) and one or more new LUTs for setting new values for delta ($\Delta$) may be introduced to support reduced UE capabilities. In some examples, the new LUTs for $K_2$ may depend at least on a PUSCH mapping type (e.g., type A, type B, slot repetition, inter-slot frequency hopping, etc.) and a PUSCH numerology (e.g., SCS, normal or extended CP, etc.) in the active UL bandwidth part (BWP). In some examples, the new LUTs for delta ($\Delta$) may depend at least on a PUSCH numerology in the active UL BWP.

The second period 1324 may be defined by the expression $K_2+\Delta+\Delta_N$, where the result of the expression $K_2+\Delta+\Delta_N$ represents a number of slots (referred to as a slot offset). Therefore, to relax the timeline for PDSCH decoding and PUSCH preparation by the UE, an additional slot offset $\Delta_N$ may be added to the slot offset defined by the previously described expression $K_2+A$. In one aspect of the disclosure, previously available LUTs (e.g., LUTs defined in Release 16) may be used for setting the values of $K_2$ and $\Delta$, while a new slot offset $\Delta_N$ may be added to the slot offset defined by the expression $K_2+A$. The value of $\Delta_N$ may be indicated to the UE using one or a combination of the following options. In a first option, one or more LUTs may be specified for $\Delta_N$ and hard-coded in a specification implemented by the UE and the base station. In a second option, un-used or reserved fields of existing DCI formats may be re-purposed to indicate the value of $\Delta_N$. In a third option, the value of $\Delta_N$ may be mapped to a MAC header or MAC subheader of a message 2 or message B transmission on the PDSCH. In a fourth option, the value of $\Delta_N$ may be mapped to a message 2 random access response or a message B FallbackRAR. In some aspects of the disclosure, the relaxed timeline for $K_2$ specified by the previously described new LUTs may also be applied to other PUSCH transmissions beyond the message 3.

In one example scenario, and as shown in FIG. 13, the UE may transmit the message 3 1328 on the PUSCH at a time 1326 (e.g., at the end of the second period 1324). In some aspects of the disclosure, the time 1326 may be adjusted based on a timing advance command (TAC).

Figure 14:
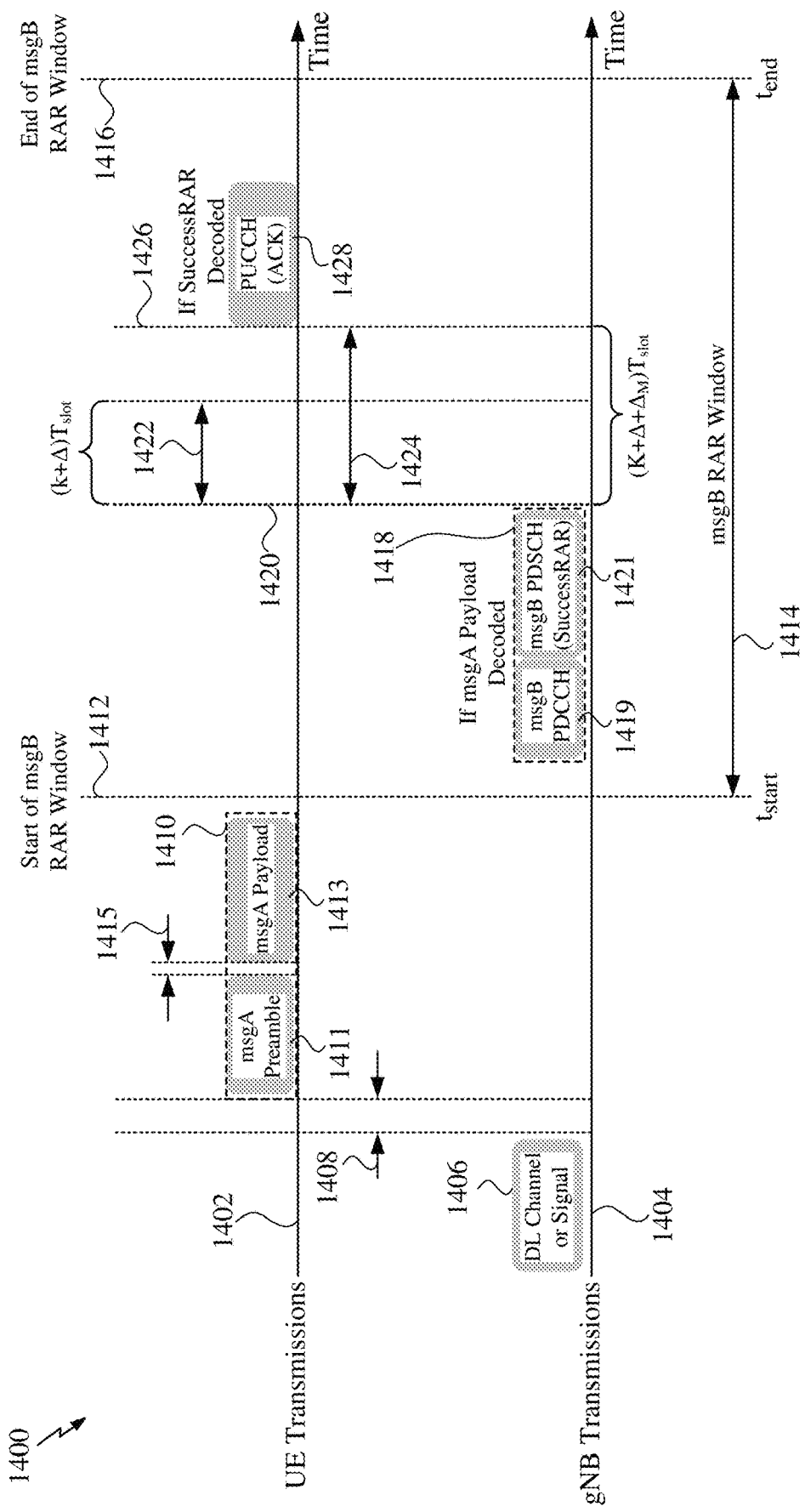
FIG. 14 includes a diagram illustrating an example timeline relaxation for a hybrid automatic repeat request (HARQ) acknowledgement in a 2-step random access procedure.

FIG. 14 includes a diagram 1400 illustrating an example timeline relaxation for a hybrid automatic repeat request (HARQ) acknowledgement (ACK) in a 2-step random access procedure. In FIG. 14, transmissions from the UE (e.g., UE 600) are shown above the UE message transmission timeline 1402. Transmissions from the base station (referred to as gNB in FIG. 14), such as the base station 500, are shown above the base station message transmission timeline 1404. The base station may initially transmit information on a downlink channel 1406, which may be used by the UE to transmit a message A (MsgA) 1410 of a 2-step random access procedure (or a message 1 in the case of a 4-step random access procedure) after a period 1408 (also referred to as an $N_{gap}$). The message A 1410 may include a PRACH preamble 1411 and a payload 1413 transmitted on PUSCH. The payload 1413 may be transmitted a period 1415 (also referred to as a gap N) after the transmission of the PRACH preamble 1411.

In some aspects of the disclosure, if the UE has reduced capability, the UE may trigger a timeline relaxation by including a request for a timeline relaxation in the message A 1410 (or in the message 1 in the case of a 4-step random access procedure). For example, the UE may need to trigger the timeline relaxation because during a contention based random access procedure or a contention free random access procedure, the base station may not be aware that the UE is a low capability UE in need of a relaxed processing timeline as described herein. In some aspects, if the UE is to perform a contention free random access procedure, the UE may report its reduced capability (before performing a contention free random access procedure) instead of including the request for a timeline relaxation in the message A 1410 (or in the message 1 in the case of a 4-step random access procedure).

After the start time $t_{start}$ 1412 of the message B RAR window 1414, if the base station successfully decoded the payload 1413 in the message A 1410 transmitted by the UE, the base station may respond by transmitting a message B (MsgB) 1418 (or the message 2 in the case of a 4-step random access procedure) including a success random access response (also referred to as SuccessRAR). The base station may transmit the message B 1418 using PDCCH 1419 for scheduling and PDSCH for transmitting the payload 1421 of the message B 1418. In some aspects of the disclosure, the base station may include an indication of relaxed timing in the message B (MsgB) 1418 (or in the message 2 in the case of a 4-step random access procedure).

As shown in FIG. 14, the timeline for transmission of the HARQ ACK message 1428 may be determined by the first period 1422 or the second period 1424. The first period 1422 may begin when the UE has received the message B 1418 (e.g., at time 1420) and may be defined by the expression $k+\Delta$, where the result of the expression $k+\Delta$ represents a number of slots (referred to as a slot offset). In some example implementations, k may be an integer representing a number of slots and may be within a range expressed as $1 \le k \le 8$. In some examples, the value of k may be dynamically indicated to the UE by the base station using a 3-bit value. For example, with reference to FIG. 15, the three bits of the PDSCH to HARQ Feedback (FB) Timing Indicator 1506 in a DCI Format 1_0 1502 may be used to set the value of k.

Figure 15:
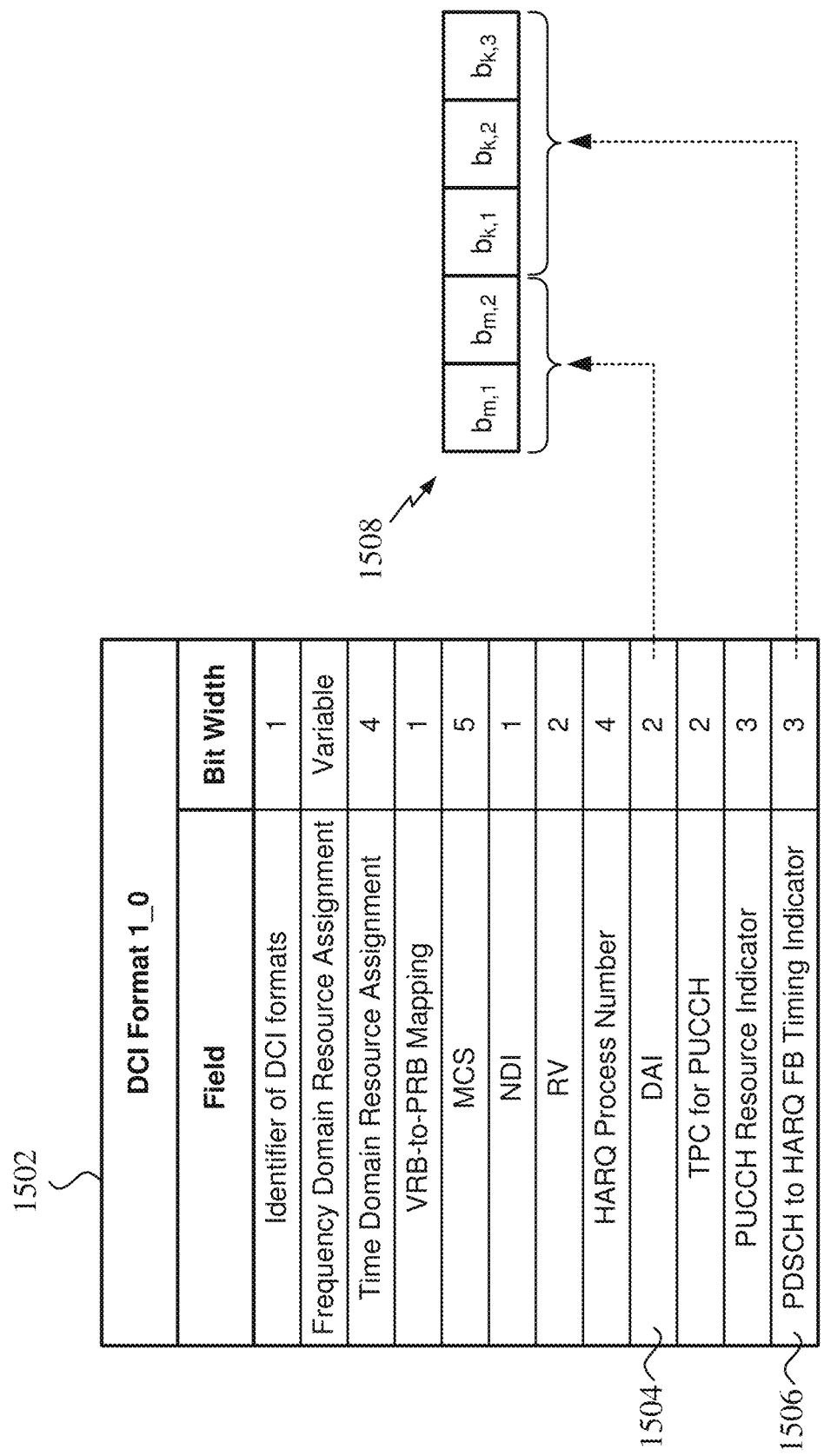
FIG. 15 shows a 5-bit slot offset indicator formed using bits in a downlink control information (DCI) format in accordance with some aspects of the present disclosure.

In some aspects of the present disclosure, the second period 1424 may be defined by the expression $K+\Delta+\Delta_M$, where the result of the expression $K+\Delta+\Delta_M$ represents a number slots (referred to as a slot offset). Therefore, to relax the timeline for PDSCH decoding and PUCCH preparation by the UE, an additional slot offset $\Delta_M$ may be added to the slot offset defined by the expression $k+\Delta$ previously described with reference to the first period 1422. In one aspect of the disclosure, to achieve the additional offset $\Delta_M$, the base station may implement a new DCI format that provides a 5-bit slot offset indicator 1508. For example, the 5-bit slot offset indicator 1508 may be formed with bits that remained unused or reserved in existing DCI formats. In one example, and as shown in FIG. 15, the first two bits $b_{m,1}$ and $b_{m,2}$ of the 5-bit slot offset indicator 1508 may be the two bits formerly used for the downlink assignment index (DAI) 1504 and the remaining three bits $b_{k,1}$, $b_{k,2}$, and $b_{k,3}$ of the 5-bit slot offset indicator 1508 may be the three bits formerly used for the PDSCH to HARQ Feedback (FB) Timing Indicator 1506.

Since the 5-bit slot offset indicator 1508 may indicate between 1 to 32 slots, the 5-bit slot offset indicator 1508 may increase the range of slots that may be used to relax the processing timeline of the UE relative to the range of slots (e.g., between 1 to 8) provided by the PDSCH to HARQ Feedback (FB) Timing Indicator 1506 in a DCI Format 1_0 1502. Moreover, it can be appreciated that implementation of the 5-bit slot offset indicator 1508 does not increase the size of a DCI format being used (e.g., a DCI format supported by Release 16, such as the DCI Format 1_0 1502).

In another aspect of the disclosure, to achieve the additional offset $\Delta_M$, the serving base station may augment the bit-width of the PDSCH to HARQ Feedback (FB) Timing Indicator 1506 by an additional M bits. In other words, the serving base station may use a total of (3+M) bits to indicate the HARQ ACK FB timing. For example, M may be an integer that is greater than zero. In some aspects of the disclosure, the serving base station (e.g., the base station 500) may signal the M bits using a combination of UE-specific signaling and UE group-common signaling. For example, the M bits may include $M_u$ bits that are to be delivered to the UE using UE-specific signaling and $M_g$ bits that are to be delivered using UE group-common signaling. Therefore, in this example, $M=M_u+M_g$, where $M_u \geq 0$, $M_g \geq 0$ and $M_u+M_g>0$. An example transmission of the $M_u$ and $M_g$ bits is described below with reference to FIG. 16.

Figure 16:
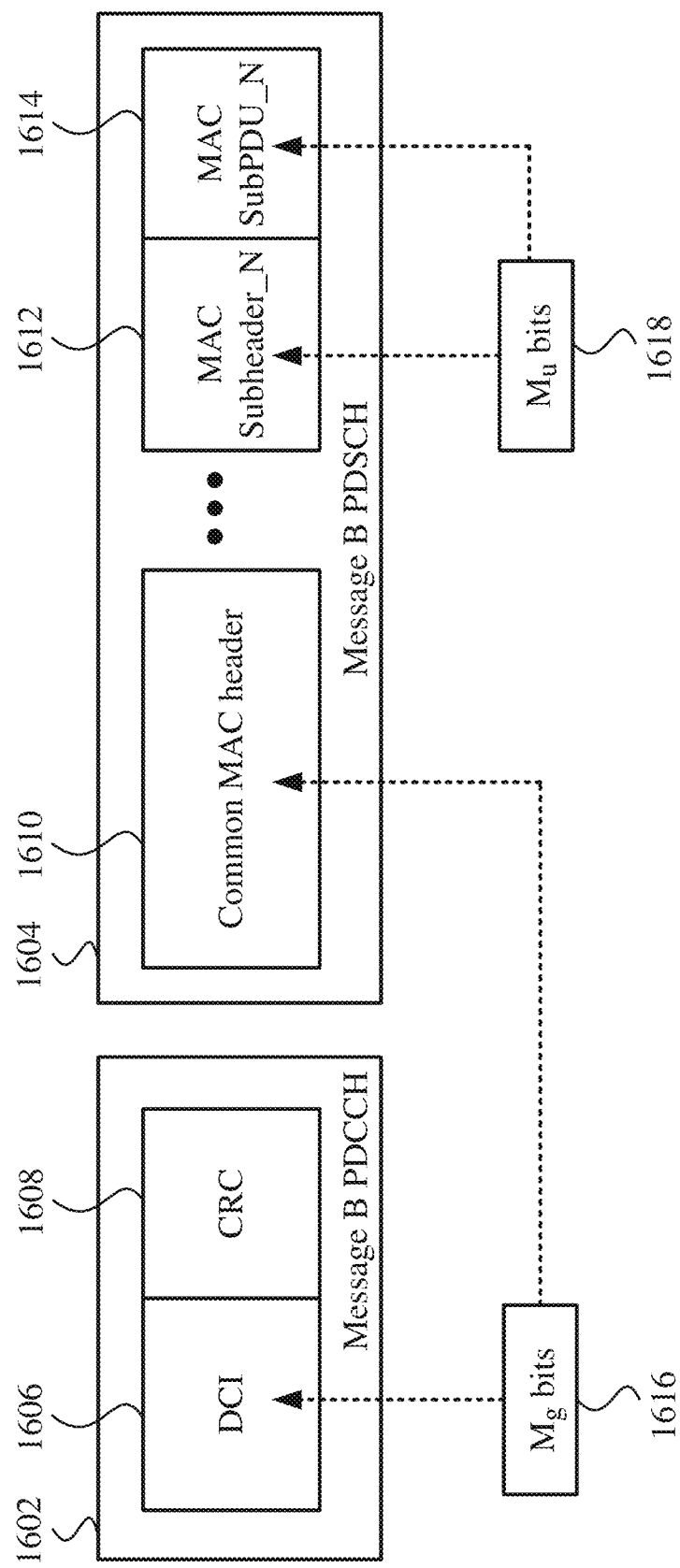
FIG. 16 is a diagram illustrating example PDCCH and PDSCH components of a message B transmission in a 2-step random access (RA) procedure.

FIG. 16 is a diagram illustrating example PDCCH and PDSCH components of a message B transmission (e.g., the message B 806) in a 2-step random access (RA) procedure. As shown in FIG. 16, a message B PDCCH transmission 1602 may include downlink control information (DCI) 1606 followed by a cyclic redundancy check (CRC) 1608. For example, the CRC 1608 may be based on the message B radio network temporary identifier (RNTI) or the message B cell RNTI (C-RNTI). The DCI 1606 may schedule the message B PDSCH transmission 1604 described below.

As shown in FIG. 16, the message B PDSCH transmission 1604 may include a common MAC header 1610, and one or more MAC subheaders and corresponding MAC sub protocol data units (subPDUs). For example, the message B PDSCH transmission 1604 may include the common MAC header 1610 and an Nth MAC subheader (MAC Subheader_N) 1612 and a corresponding Nth MAC subPDU (Sub-PDU_N) 1614.

In one example implementation, and as shown in FIG. 16, the $M_g$ bits 1616 may be UE group-specific bits and may be mapped at least to the group-common DCI (e.g., DCI 1606) of the message B PDCCH 1602 or the common MAC header 1610 of the message B PDSCH transmission 1604. The $M_u$ bits 1618 may be UE-specific bits and may be mapped at least to the MAC subheader (e.g., MAC subheader_N 1612) of the message B PDSCH transmission 1604 or the MAC subPDU (e.g., the MAC SubPDU_N 1614) carrying SuccessRAR of the (single) UE.

In one example scenario, and as shown in FIG. 14, the UE may transmit the HARQ ACK message 1428 on PUCCH at a time 1426 (e.g., at the end of the second period 1424). In some aspects of the disclosure, the time 1426 may be adjusted based on a timing advance command (TAC).

PUCCH Coverage Enhancements

The aspects described herein may improve reliability of PUCCH transmissions from UEs having reduced capability. For example, and as previously described, a UE with reduced capability may have a reduced bandwidth, a reduced number of transmit/receive antennas, half-duplex frequency division duplex (FDD), a power class reduction (e.g., reduced transmission power), and/or a relaxed processing timeline/capability as compared to a standard UE. Such reduced capability may compromise uplink (UL) transmissions from the UE (e.g., due to inadequate PUCCH coverage), which may significantly impair the performance and/or functionality of the UEs with reduced capability.

In some aspects of the disclosure, a UE with reduced capability may trigger a PUCCH coverage enhancement when performing a contention based random access procedure or a contention free random access procedure. PUCCH coverage enhancement may refer to an operation for providing additional (e.g., improved) PUCCH resources to the UE. For example, the UE may trigger a PUCCH coverage enhancement by including a request for PUCCH coverage enhancement in the message 1 (e.g., the message 1 704) of a 4-step random access procedure or the message A (e.g., the message A 804) of a 2-step random access procedure. For example, the UE may need to trigger the PUCCH coverage enhancement because during a contention based random access procedure or a contention free random access procedure, the base station may not be aware that the UE has reduced capability and needs improved PUCCH performance (e.g., higher reliability PUCCH transmissions). In some aspects, if the UE is to perform a contention free random access procedure, the UE may report its reduced capability (before performing a contention free random access procedure) instead of including the request for a PUCCH coverage enhancement in the message 1 or the message A.

Upon detecting the request for PUCCH coverage enhancement in the message 1 or message A, the serving base station (e.g., base station 500) may implement enhanced PUCCH resource indication schemes. For example, the serving base station may augment the size of a look up table (LUT) used for PUCCH resource configuration by adding new and/or existing PUCCH formats. For example, the serving base station may augment a LUT including 16 possible PUCCH formats to include 32 PUCCH formats, 64 PUCCH formats, or other suitable number of PUCCH formats.

In some aspects of the disclosure, the serving base station, in response to the previously described request for PUCCH coverage enhancement in the message 1 or message A, may signal PUCCH repetition levels and/or frequency hopping schemes. In one example implementation, a new field may be configured to indicate to the UE the new configurations for PUCCH formats, PUCCH repetition levels and/or frequency hopping patterns (e.g., 2-hop frequency hopping, 4-hop frequency hopping, inter-slot frequency hopping, intra-slot frequency hopping, etc.) available for PUCCH transmissions.

For example, the new configurations for PUCCH formats, PUCCH repetition levels, and/or frequency hopping patterns may be supported by increasing the field size of a PUCCH resource indication using one or a combination of the following options. In a first option, un-used or reserved fields of existing DCI formats (e.g., DCI formats supported by Release 16) may be re-purposed to indicate the PUCCH formats, PUCCH repetition levels, and/or frequency hopping patterns. In a second option, the one or more bits configured to indicate the PUCCH formats, PUCCH repetition levels, and/or frequency hopping patterns may be mapped to a MAC header, a MAC subheader, or a MAC subPDU of a message 2 or message B transmission on PDSCH. In a third option, a combination of the first and second options above may be used to increase the field size of the PUCCH resource indication. For example, the additional bits needed for increasing the field size of the PUCCH resource indication may be included in PDCCH and/or PDSCH. In some aspects of the disclosure, the augmented LUTs for PUCCH resource configuration may also be applied to HARQ feedback beyond a random access procedure.

Figure 17:
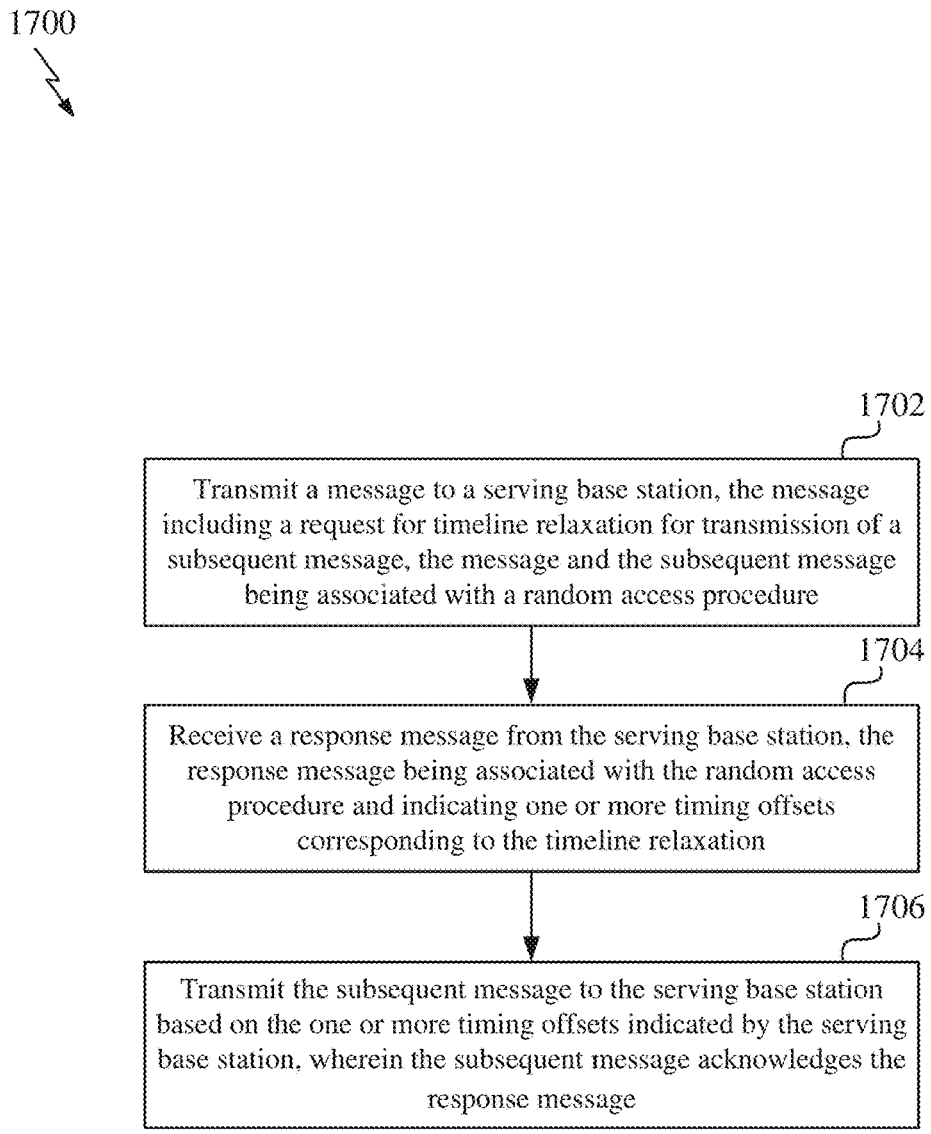
FIG. 17 is a flow chart illustrating an exemplary procedure for relaxing a timeline for a UE during a random access procedure in accordance with some aspects of the present disclosure.

FIG. 17 is a flow chart illustrating an exemplary procedure 1700 for relaxing a timeline for a UE during a random access procedure in accordance with some aspects of the present disclosure. As described below, some or all illustrated features may be omitted in a particular implementation within the scope of the present disclosure, and some illustrated features may not be required for implementation of all embodiments. In some examples, the procedure 1700 may be carried out by the UE 600 illustrated in FIG. 6. In some examples, the procedure 1700 may be carried out by any suitable apparatus or means for carrying out the functions or algorithm described below.

At 1702, the UE may transmit a message to a serving base station, the message including a request for timeline relaxation for transmission of a subsequent message, the message and the subsequent message being associated with a random access procedure. For example, the message may be the message 1 704 in FIG. 7, the message 3 708, the message A 804 in FIG. 8, or the message A 1310 in FIG. 13.

At 1704, the UE may receive a response message from the serving base station, the response message being associated with the random access procedure and indicating one or more timing offsets corresponding to the timeline relaxation. For example, the response message may be the message 2 706 in FIG. 7, the message 4 710, the message B 806 in FIG. 8, or the message B 1318 in FIG. 13.

In some aspects of the disclosure, the one or more timing offsets includes a first timing offset (e.g., a number of slots represented by the expression $K_2+\Delta$ as previously described) comprising a first slot offset (e.g., $K_2$) and a second slot offset (e.g., $\Delta$). A value of the first slot offset is obtained from a first set of lookup tables (LUTs) based on at least the request for the timeline relaxation, a physical uplink shared channel (PUSCH) mapping type or a PUSCH numerology in an active uplink (UL) bandwidth part (BWP). A value of the second slot offset is obtained from a second set of lookup tables (LUTs) based on at least the request for the timeline relaxation or the PUSCH numerology in the active uplink (UL) bandwidth part (BWP). For example, the PUSCH mapping type may be a type A, a type B, a slot repetition configuration, or an inter-slot frequency hopping configuration. For example, the PUSCH numerology may be based on a subcarrier spacing (SCS) value, a normal cyclic prefix, or an extended cyclic prefix.

In some aspects of the disclosure, the one or more timing offsets includes a first timing offset (e.g., a number of slots represented by the expression $K_2+\Delta$ as previously described) and a second timing offset (e.g., a number of slots represented by the term $\Delta_N$). The second timing offset may be an amount of the timeline relaxation. The first timing offset may include a first slot offset (e.g., $K_2$) and a second slot offset (e.g., $\Delta$). The second timing offset may include a third slot offset (e.g., $\Delta_N$). In some aspects, the UE receives the response message using a physical downlink control channel (PDCCH) and a physical downlink shared channel (PDSCH), and wherein the response message indicates a value of the third slot offset in at least one of a lookup table preconfigured by a network for the UE, in a downlink control information (DCI) received on the physical downlink control channel (PDCCH) as part of the random access procedure, or in a media access control (MAC) header, a MAC subheader, or a MAC sub protocol data unit (subPDU) received on the physical downlink shared channel (PDSCH) as part of the random access procedure.

At 1706, the UE may transmit the subsequent message to the serving base station based on the one or more timing offsets indicated by the serving base station, wherein the subsequent message acknowledges the response message. For example, the subsequent message may be the message 3 1328 or the message 3 708.

Figure 18:
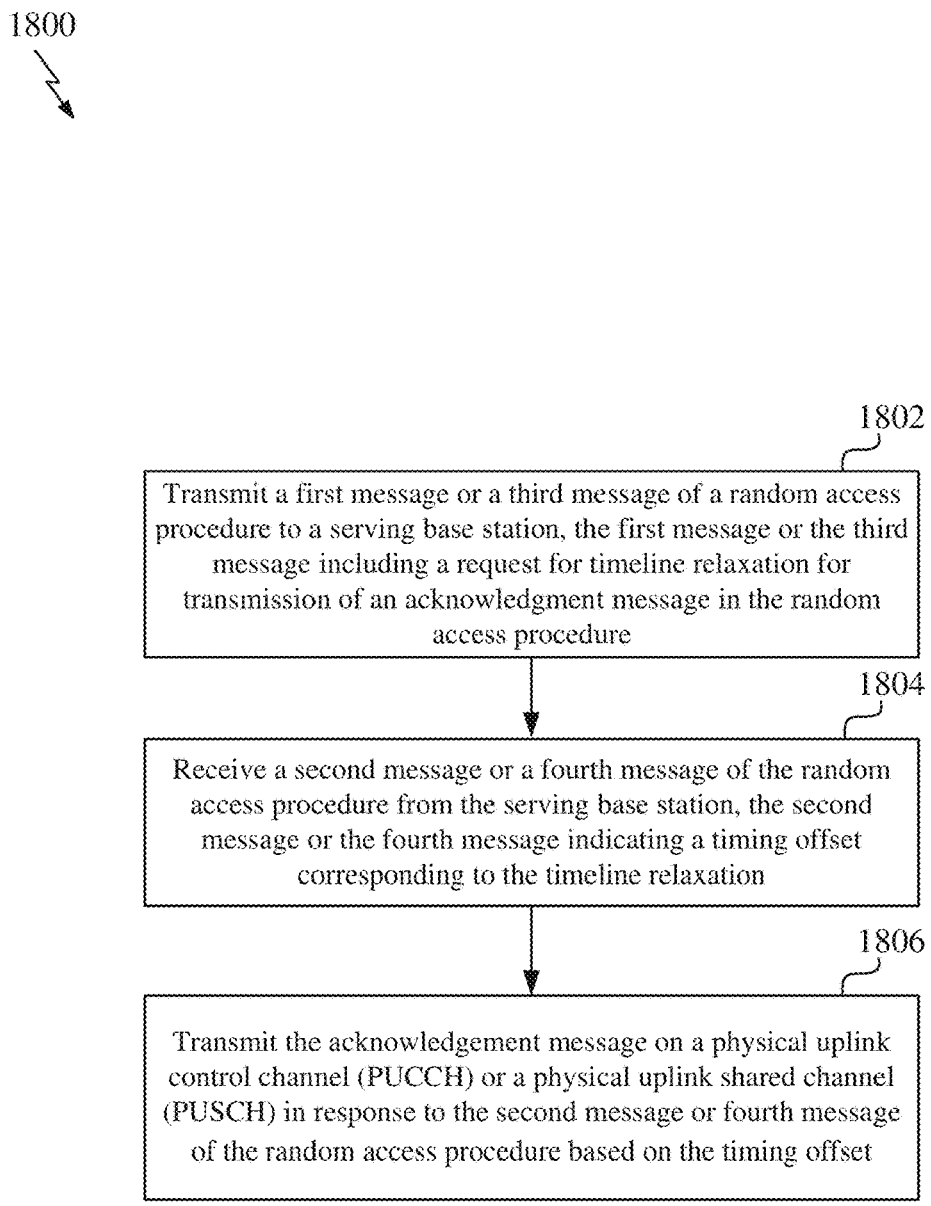
FIG. 18 is a flow chart illustrating an exemplary procedure for relaxing a timeline for a UE during a random access procedure in accordance with some aspects of the present disclosure.

FIG. 18 is a flow chart illustrating an exemplary procedure 1800 for relaxing a timeline for a UE during a random access procedure in accordance with some aspects of the present disclosure. As described below, some or all illustrated features may be omitted in a particular implementation within the scope of the present disclosure, and some illustrated features may not be required for implementation of all embodiments. In some examples, the procedure 1800 may be carried out by the UE 600 illustrated in FIG. 6. In some examples, the procedure 1800 may be carried out by any suitable apparatus or means for carrying out the functions or algorithm described below.

At 1802, the UE may transmit a first message or a third message of a random access procedure to a serving base station, the first message or the third message including a request for timeline relaxation for transmission of an acknowledgment message in the random access procedure. For example, the first message may be the message 1 704 in FIG. 7, the message A 804 in FIG. 8, or the message A 1410 in FIG. 14. For example, the third message may be the message 3 708 in FIG. 7, or the message 3 1328.

At 1804, the UE may receive a second message or a fourth message of the random access procedure from the serving base station, the second message or the fourth message indicating a timing offset corresponding to the timeline relaxation. For example, the second message may be the message 2 706 in FIG. 7, the message B 806 in FIG. 8, or the message B 1418 in FIG. 14. For example, the fourth message may be the message 4 710 in FIG. 7.

In an aspect of the disclosure, the timing offset is indicated as a number of slots (e.g., the number of slots represented by the expression $K+\Delta+\Delta_M$ in FIG. 14) using one or more bits of a downlink control information (DCI) format and a plurality of bits allocated to a physical downlink shared channel (PDSCH) to hybrid automatic repeat request (HARQ) feedback (FB) timing indicator in the DCI format. For example, the one or more bits of the DCI format and the plurality of bits allocated to the PDSCH to HARQ FB timing indicator in the DCI format may form a 5-bit value. In this example, the 5-bit value indicates a value for the timeline relaxation that is within a range of one to 32 slots. For example, the 5-bit value may be the 5-bit slot offset indicator 1508 shown in FIG. 15.

In an aspect of the disclosure, the timing offset is indicated by a group-specific slot offset and a UE-specific slot offset, wherein the group-specific slot offset is indicated as a number of slots using one or more UE group-specific bits carried by downlink control information (DCI) of the PDCCH or by a common media access control (MAC) header of the PDSCH. The UE-specific slot offset is indicated as one or more UE-specific bits carried by downlink control information (DCI) of the PDCCH, or by a MAC subheader or a MAC sub protocol data unit (subPDU) of the PDSCH. The PDCCH and the PDSCH are mapped to the response message. In an aspect of the disclosure, the second message carries a success random access response (SuccessRAR) with respect to the first message.

At 1806, the UE may transmit the acknowledgement message on a physical uplink control channel (PUCCH) or a physical uplink shared channel (PUSCH) in response to the second message or fourth message of the random access procedure based on the timing offset. In some examples, the second message or fourth message of the random access procedure may be considered the last message of the random access procedure. For example, the second message or fourth message of the random access procedure (e.g., the last message of the random access procedure) may be the message 4 710 in FIG. 7, the message B 806 in FIG. 8, or the message B 1418 in FIG. 14.

Figure 19:
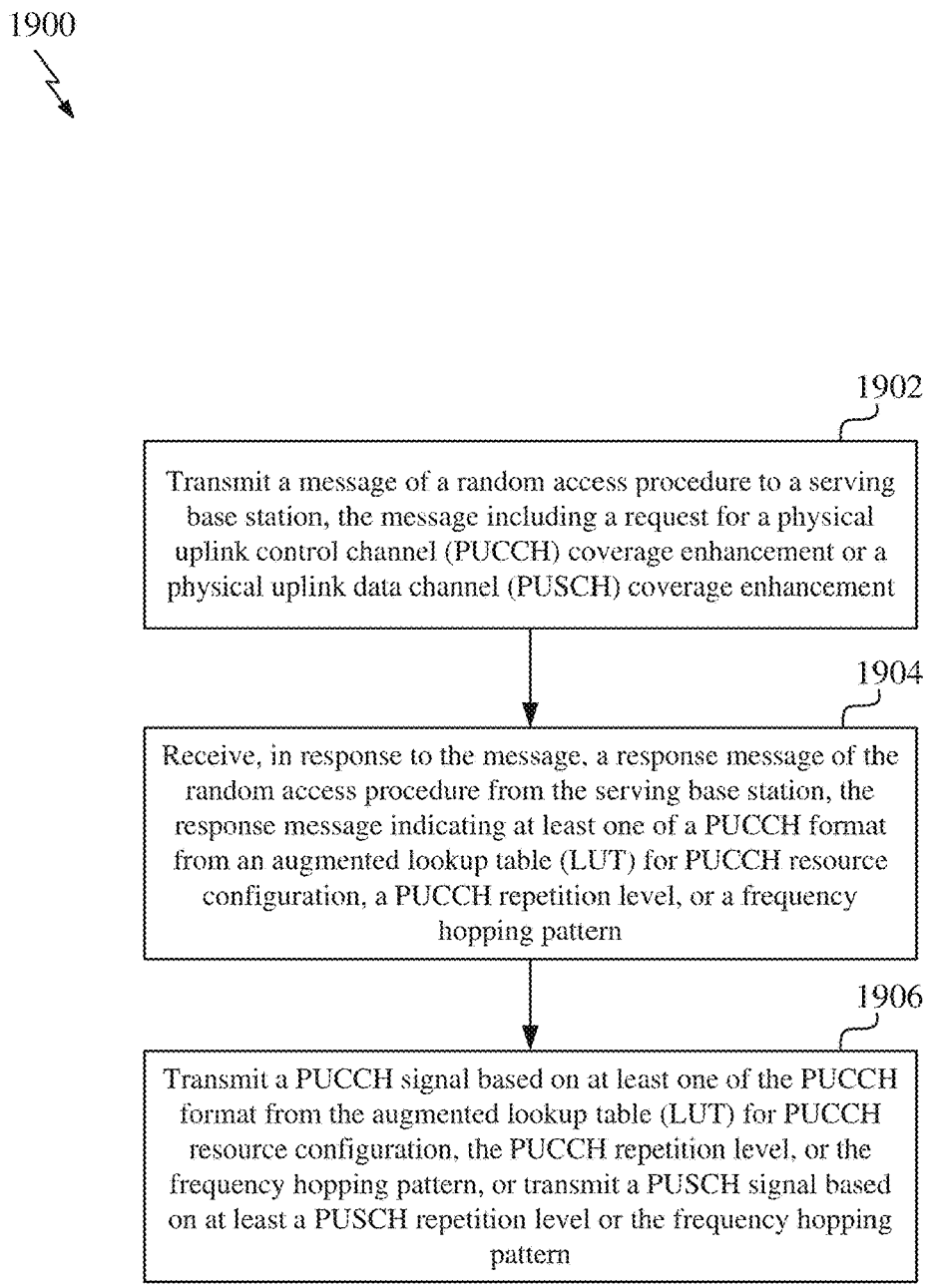
FIG. 19 is a flow chart illustrating an exemplary procedure for enhancing coverage of a physical uplink control channel (PUCCH) in accordance with some aspects of the present disclosure.

FIG. 19 is a flow chart illustrating an exemplary procedure 1900 for enhancing coverage of a PUCCH in accordance with some aspects of the present disclosure. As described below, some or all illustrated features may be omitted in a particular implementation within the scope of the present disclosure, and some illustrated features may not be required for implementation of all embodiments. In some examples, the procedure 1900 may be carried out by the UE 600 illustrated in FIG. 6. In some examples, the procedure 1900 may be carried out by any suitable apparatus or means for carrying out the functions or algorithm described below.

At 1902, the UE may transmit a message of a random access procedure to a serving base station, the message including a request for a physical uplink control channel (PUCCH) coverage enhancement or a physical uplink shared channel (PUSCH) coverage enhancement. For example, the message of the random access procedure may be the message 1 704 in FIG. 7, the message 3 708, or the message A 804 in FIG. 8.

At 1904, the UE may receive, in response to the message, a response message of the random access procedure from the serving base station, the response message indicating at least one of a PUCCH format from an augmented lookup table (LUT) for PUCCH resource configuration, a PUCCH repetition level, a PUSCH repetition level, or a frequency hopping pattern. For example, the response message may be the message 2 706 in FIG. 7, the message 4 710, or the message B 806 in FIG. 8.

In an aspect, at least one of the PUCCH format from the augmented LUT, the PUCCH repetition level, the PUSCH repetition level, or the frequency hopping pattern is indicated using a plurality of bits. One or more of the plurality of bits may be bits of a downlink control information (DCI) format.

In an aspect, at least one of the PUCCH format from the augmented LUT, the PUCCH repetition level, the PUSCH repetition level or the frequency hopping pattern is indicated using one or more bits mapped to at least a media access control (MAC) header, a MAC subheader, or a MAC sub protocol data unit (subPDU) in the response message.

In an aspect, at least one of the PUCCH format from the augmented LUT, the PUCCH repetition level, the PUSCH repetition level or the frequency hopping pattern is indicated using a plurality of bits, where the plurality of bits is a combination of at least one or more bits of a downlink control information (DCI) format and one or more bits mapped to at least a media access control (MAC) header, a MAC subheader, or a MAC sub protocol data unit (subPDU) in the response message.

At 1906, the UE may transmit a PUCCH signal based on at least one of the PUCCH format from the augmented lookup table (LUT) for PUCCH resource configuration, the PUCCH repetition level, or the frequency hopping pattern, or may transmit a PUSCH signal based on at least a PUSCH repetition level or the frequency hopping pattern.

Figure 20:
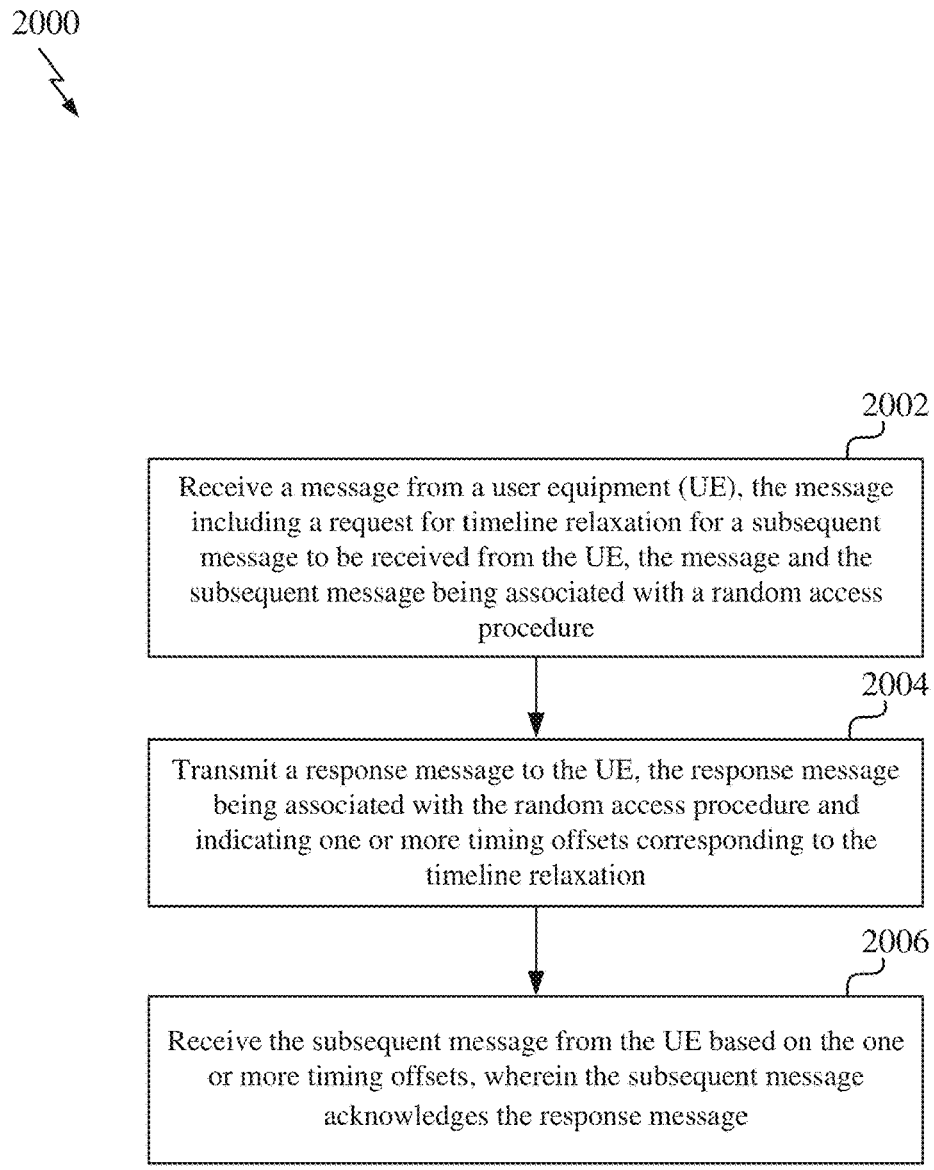
FIG. 20 is a flow chart illustrating an exemplary procedure for relaxing a timeline for a base station during a random access procedure in accordance with some aspects of the present disclosure.

FIG. 20 is a flow chart illustrating an exemplary procedure 2000 for relaxing a timeline for a UE during a random access procedure in accordance with some aspects of the present disclosure. As described below, some or all illustrated features may be omitted in a particular implementation within the scope of the present disclosure, and some illustrated features may not be required for implementation of all embodiments. In some examples, the procedure 2000 may be carried out by the base station 500 illustrated in FIG. 5. In some examples, the procedure 2000 may be carried out by any suitable apparatus or means for carrying out the functions or algorithm described below.

At 2002, the base station may receive a message from a user equipment (UE), the message including a request for timeline relaxation for a subsequent message to be received from the UE, the message and the subsequent message being associated with a random access procedure. For example, the message may be the message 1 704 in FIG. 7, the message 3 708, the message A 804 in FIG. 8, or the message A 1310 in FIG. 13.

At 2004, the base station may transmit a response message to the UE, the response message being associated with the random access procedure and indicating one or more timing offsets corresponding to the timeline relaxation. For example, the response message may be the message 2 706 in FIG. 7, the message 4 710, the message B 806 in FIG. 8, or the message B 1318 in FIG. 13.

In some aspects of the disclosure, the one or more timing offsets includes a first timing offset (e.g., a number of slots represented by the expression $K_2+\Delta$ as previously described) comprising a first slot offset (e.g., $K_2$) and a second slot offset (e.g., $\Delta$). A value of the first slot offset is obtained from a first set of lookup tables (LUTs) based on at least the request for the timeline relaxation, a physical uplink shared channel (PUSCH) mapping type or a PUSCH numerology in an active uplink (UL) bandwidth part (BWP). A value of the second slot offset is obtained from a second set of lookup tables (LUTs) based on at least the request for the timeline relaxation or the PUSCH numerology in the active uplink (UL) bandwidth part (BWP). For example, the PUSCH mapping type may be a type A, a type B, a slot repetition configuration, or an inter-slot frequency hopping configuration. For example, the PUSCH numerology may be based on a subcarrier spacing (SCS) value, a normal cyclic prefix, or an extended cyclic prefix.

In some aspects of the disclosure, the one or more timing offsets includes a first timing offset (e.g., a number of slots represented by the expression $K_2+\Delta$ as previously described) and a second timing offset (e.g., a number of slots represented by the term $\Delta_N$). The second timing offset may be an amount of the timeline relaxation. The first timing offset may include a first slot offset (e.g., $K_2$) and a second slot offset (e.g., $\Delta$). The second timing offset may include a third slot offset (e.g., $\Delta_N$). In some aspects, the base station transmits the response message using a physical downlink control channel (PDCCH) and a physical downlink shared channel (PDSCH), and wherein the response message indicates a value of the third slot offset in at least one of a lookup table preconfigured by a network for the UE, in a downlink control information (DCI) transmitted on the physical downlink control channel (PDCCH) as part of the random access procedure, or in a media access control (MAC) header, a MAC subheader, or a MAC sub protocol data unit (subPDU) transmitted on the physical downlink shared channel (PDSCH) as part of the random access procedure.

At 2006, the base station may receive the subsequent message from the UE based on the one or more timing offsets, wherein the subsequent message acknowledges the response message. For example, the subsequent message may be the message 3 1328 or the message 3 708.

Figure 21:
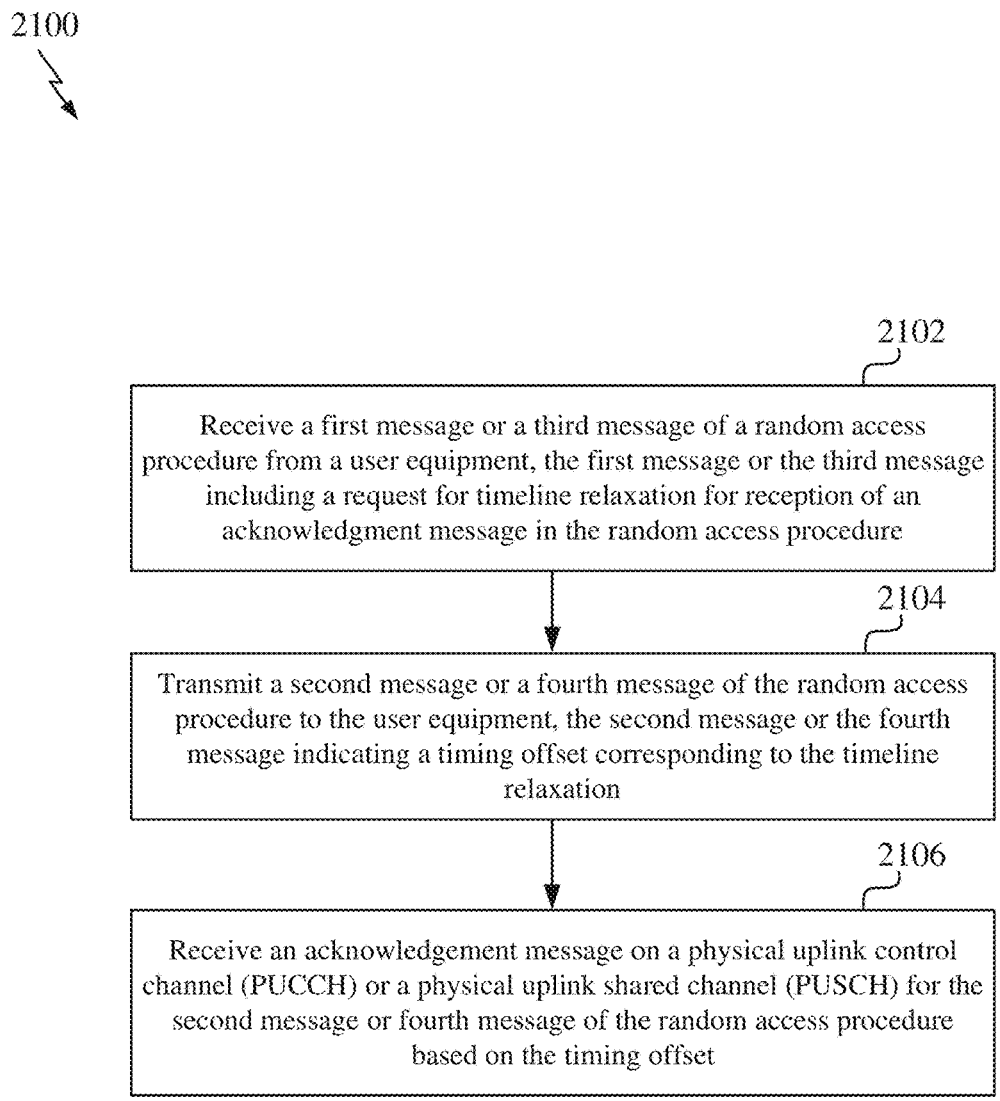
FIG. 21 is a flow chart illustrating an exemplary procedure for relaxing a timeline for a base station during a random access procedure in accordance with some aspects of the present disclosure.

FIG. 21 is a flow chart illustrating an exemplary procedure 2100 for relaxing a timeline for a UE during a random access procedure in accordance with some aspects of the present disclosure. As described below, some or all illustrated features may be omitted in a particular implementation within the scope of the present disclosure, and some illustrated features may not be required for implementation of all embodiments. In some examples, the procedure 2100 may be carried out by the base station 500 illustrated in FIG. 5. In some examples, the procedure 2100 may be carried out by any suitable apparatus or means for carrying out the functions or algorithm described below.

At 2102, the base station may receive a first message or a third message of a random access procedure from a user equipment, the first message or the third message including a request for timeline relaxation for reception of an acknowledgment message in the random access procedure. For example, the first message may be the message 1 704 in FIG. 7, the message A 804 in FIG. 8, or the message A 1410 in FIG. 14. For example, the third message may be the message 3 708 in FIG. 7, or the message 3 1328.

At 2104, the base station may transmit a second message or a fourth message of the random access procedure to the user equipment, the second message or the fourth message indicating a timing offset corresponding to the timeline relaxation. For example, the second message may be the message 2 706 in FIG. 7, the message B 806 in FIG. 8, or the message B 1418 in FIG. 14. For example, the fourth message may be the message 4 710 in FIG. 7.

In an aspect of the disclosure, the timing offset is indicated as a number of slots (e.g., the number of slots represented by the expression $K+\Delta+\Delta_M$ in FIG. 14) using one or more bits of a downlink control information (DCI) format and a plurality of bits allocated to a physical downlink shared channel (PDSCH) to hybrid automatic repeat request (HARQ) feedback (FB) timing indicator in the DCI format. For example, the one or more bits of the DCI format and the plurality of bits allocated to the PDSCH to HARQ FB timing indicator in the DCI format may form a 5-bit value. In this example, the 5-bit value indicates a value for the timeline relaxation that is within a range of one to 32 slots. For example, the 5-bit value may be the 5-bit slot offset indicator 1508 shown in FIG. 15.

In an aspect of the disclosure, the timing offset is indicated by a group-specific slot offset and a UE-specific slot offset, wherein the group-specific slot offset is indicated as a number of slots using one or more UE group-specific bits carried by downlink control information (DCI) of the PDCCH or by a common media access control (MAC) header of the PDSCH. The UE-specific slot offset is indicated as one or more UE-specific bits carried by downlink control information (DCI) of the PDCCH, or by a MAC subheader or a MAC sub protocol data unit (subPDU) of the PDSCH. The PDCCH and the PDSCH are mapped to the response message. In an aspect, the second message or the fourth message carries a success random access response (SuccessRAR) with respect to the first message or the third message of the random access procedure.

At 2106, the base station may receive an acknowledgement message on a physical uplink control channel (PUCCH) or a physical uplink shared channel (PUSCH) for the second message or fourth message of the random access procedure based on the timing offset. For example, the fourth message of the random access procedure may be the message 4 710 in FIG. 7. For example, the second message may be the message B 806 in FIG. 8, or the message B 1418 in FIG. 14.

Figure 22:
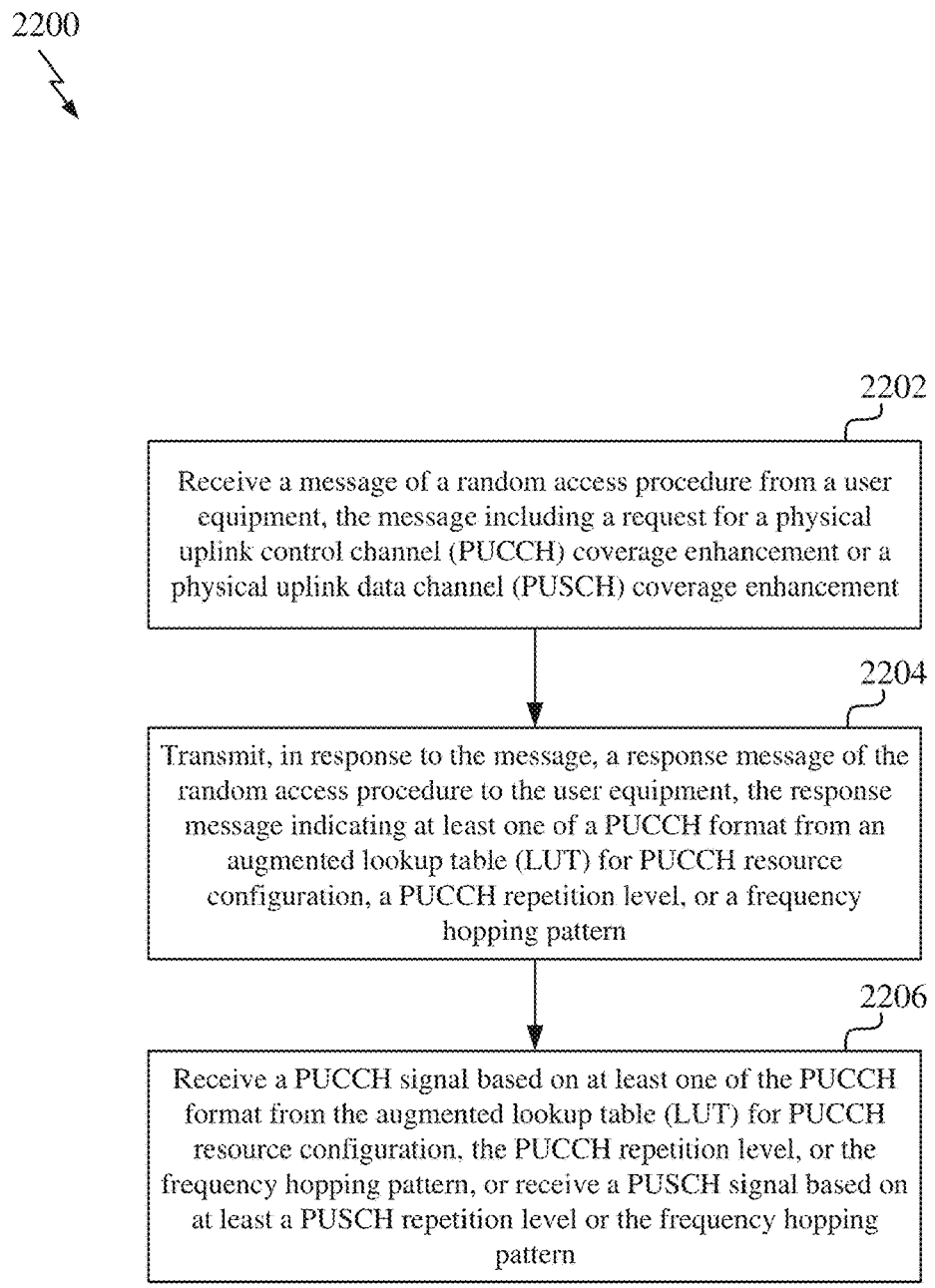
FIG. 22 is a flow chart illustrating an exemplary procedure for enhancing coverage of a PUCCH in accordance with some aspects of the present disclosure.

FIG. 22 is a flow chart illustrating an exemplary procedure 2200 for enhancing coverage of a PUCCH in accordance with some aspects of the present disclosure. As described below, some or all illustrated features may be omitted in a particular implementation within the scope of the present disclosure, and some illustrated features may not be required for implementation of all embodiments. In some examples, the procedure 2200 may be carried out by the base station 500 illustrated in FIG. 5. In some examples, procedure 2200 may be carried out by any suitable apparatus or means for carrying out the functions or algorithm described below.

At 2202, the base station may receive a message of a random access procedure from a user equipment, the message including a request for a physical uplink control channel (PUCCH) coverage enhancement or a physical uplink shared channel (PUSCH) coverage enhancement. For example, the message of the random access procedure may be the message 1 704 in FIG. 7, the message 3 708, or the message A 804 in FIG. 8.

At 2204, the base station may transmit, in response to the message, a response message of the random access procedure to the user equipment, the response message indicating at least one of a PUCCH format from an augmented lookup table (LUT) for PUCCH resource configuration, a PUCCH repetition level, or a frequency hopping pattern. For example, the response message may be the message 2 706 in FIG. 7, the message 4 710, or the message B 806 in FIG. 8.

In an aspect, at least one of the PUCCH format from the augmented LUT, the PUCCH repetition level, the PUSCH repetition level, or the frequency hopping pattern is indicated using a plurality of bits. The one or more of the plurality of bits may be bits of a downlink control information (DCI) format.

In an aspect, at least one of the PUCCH format from the augmented LUT, the PUCCH repetition level, the PUSCH repetition level or the frequency hopping pattern is indicated using one or more bits mapped to at least a media access control (MAC) header, a MAC subheader, or a MAC sub protocol data unit (subPDU) in the response message.

In an aspect, at least one of the PUCCH format from the augmented LUT, the PUCCH repetition level, the PUSCH repetition level or the frequency hopping pattern is indicated using a plurality of bits, where the plurality of bits is a combination of at least one or more bits of a downlink control information (DCI) format and one or more bits mapped to at least a media access control (MAC) header, a MAC subheader, or a MAC sub protocol data unit (subPDU) in the response message.

At 2206, the base station may receive a PUCCH signal based on at least one of the PUCCH format from the augmented lookup table (LUT) for PUCCH resource configuration, the PUCCH repetition level, or the frequency hopping pattern, or receive a PUSCH signal based on at least a PUSCH repetition level or the frequency hopping pattern.

In one configuration, the apparatus 600 for wireless communication includes means for performing the various functions described herein. For example, the apparatus 600 may include means for transmitting a message to a serving base station, the message including a request for timeline relaxation for transmission of a subsequent message, the message and the subsequent message being associated with a random access procedure, means for receiving a response message from the serving base station, the response message being associated with the random access procedure and indicating one or more timing offsets corresponding to the timeline relaxation, means for transmitting the subsequent message to the serving base station based on the one or more timing offsets indicated by the serving base station, wherein the subsequent message acknowledges the response message, means for transmitting a first message or a third message of a random access procedure to a serving base station, the first message or the third message including a request for timeline relaxation for transmission of an acknowledgment message in the random access procedure, means for receiving a second message or a fourth message of the random access procedure from the serving base station, the second message or the fourth message indicating a timing offset corresponding to the timeline relaxation, means for transmitting the acknowledgement message on a physical uplink control channel (PUCCH) or a physical uplink shared channel (PUSCH) in response to the second message or fourth message of the random access procedure based on the timing offset, means for transmitting a message of a random access procedure to a serving base station, the message including a request for a physical uplink control channel (PUCCH) coverage enhancement or a physical uplink shared channel (PUSCH) coverage enhancement, means for receiving, in response to the message, a response message of the random access procedure from the serving base station, the response message indicating at least one of a PUCCH format from an augmented lookup table (LUT) for PUCCH resource configuration, a PUCCH repetition level, or a frequency hopping pattern, and means for transmitting a PUCCH signal based on at least one of the PUCCH format from the augmented lookup table (LUT) for PUCCH resource configuration, the PUCCH repetition level, or the frequency hopping pattern, or transmitting a PUSCH signal based on at least a PUSCH repetition level or the frequency hopping pattern. In one aspect, the aforementioned means may be the processor(s) 604 shown in FIG. 6 configured to perform the functions recited by the aforementioned means. In another aspect, the aforementioned means may be a circuit or any apparatus configured to perform the functions recited by the aforementioned means.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1, 2, and/or 3, and utilizing, for example, the processes and/or algorithms described herein in relation to FIGS. 17-19.

In one configuration, the apparatus 500 for wireless communication includes means for performing the various functions described herein. For example, the apparatus 500 may include means for receiving a message from a user equipment (UE), the message including a request for timeline relaxation for a subsequent message to be received from the UE, the message and the subsequent message being associated with a random access procedure, means for transmitting a response message to the UE, the response message being associated with the random access procedure and indicating one or more timing offsets corresponding to the timeline relaxation, means for receiving the subsequent message from the UE based on the one or more timing offsets, wherein the subsequent message acknowledges the response message, means for receiving a first message or a third message of a random access procedure from a user equipment, the first message or the third message including a request for timeline relaxation for reception of an acknowledgment message in the random access procedure, means for transmitting a second message or a fourth message of the random access procedure to the user equipment, the second message or the fourth message indicating a timing offset corresponding to the timeline relaxation, means for receiving an acknowledgement message on a physical uplink control channel (PUCCH) or a physical uplink shared channel (PUSCH) for the second message or fourth message of the random access procedure based on the timing offset, means for receiving a message of a random access procedure from a user equipment, the message including a request for a PUCCH coverage enhancement or a PUSCH coverage enhancement, means for transmitting, in response to the message, a response message of the random access procedure to the user equipment, the response message indicating at least one of a PUCCH format from an augmented lookup table (LUT) for PUCCH resource configuration, a PUCCH repetition level, or a frequency hopping pattern, means for receiving a PUCCH signal based on at least one of the PUCCH format from the augmented lookup table (LUT) for PUCCH resource configuration, the PUCCH repetition level, or the frequency hopping pattern, or receive a PUSCH signal based on at least a PUSCH repetition level or the frequency hopping pattern.

In one aspect, the aforementioned means may be the processor(s) 504 shown in FIG. 5 configured to perform the functions recited by the aforementioned means. In another aspect, the aforementioned means may be a circuit or any apparatus configured to perform the functions recited by the aforementioned means.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1, 2, and/or 3, and utilizing, for example, the processes and/or algorithms described herein in relation to FIGS. 20-22.

Therefore, the aspects described herein may enable UEs with reduced capabilities to trigger a timeline relaxation, a PUCCH coverage enhancement, and/or a PUSCH coverage enhancement during a network access procedure for improved performance. The relaxed processing timeline (e.g., the UE message transmission timeline 1302, 1402) may provide the UEs with reduced capabilities an appropriate amount of time (e.g., the second period 1324 defined by the expression $K_2+\Delta+\Delta_N$, the second period 1424 defined by the expression $K+\Delta+\Delta_M$) to decode messages from a base station (e.g., messages of a random access procedure) and to prepare messages (e.g., messages of a random access procedure) to be transmitted to a base station. Moreover, when a UE with reduced capabilities requests a PUCCH coverage enhancement during a network access procedure, the serving base station (e.g., base station 500) may implement enhanced PUCCH resource indication schemes as described herein to improve the performance and reliability for the PUCCH.

The following provides an overview of aspects of the present disclosure:

Example 1: A method of wireless communication for a user equipment (UE), comprising: transmitting a message to a serving base station, the message including a request for timeline relaxation for transmission of a subsequent message, the message and the subsequent message being associated with a random access procedure; receiving a response message from the serving base station, the response message being associated with the random access procedure and indicating one or more timing offsets corresponding to the timeline relaxation; and transmitting the subsequent message to the serving base station based on the one or more timing offsets indicated by the serving base station, wherein the subsequent message acknowledges the response message.

Example 2: The method of example 1, wherein the one or more timing offsets includes a first timing offset comprising a first slot offset and a second slot offset, wherein a value of the first slot offset is obtained from a first set of lookup tables (LUTs) based on at least the request for the timeline relaxation, a physical uplink shared channel (PUSCH) mapping type or a PUSCH numerology in an active uplink (UL) bandwidth part (BWP), and wherein a value of the second slot offset is obtained from a second set of lookup tables (LUTs) based on at least the request for the timeline relaxation or the PUSCH numerology in the active uplink (UL) bandwidth part (BWP).

Example 3: The method of example 2, wherein the PUSCH mapping type is a type of predetermined standard-based mapping, and wherein the PUSCH numerology is based on a subcarrier spacing (SCS) value, a normal cyclic prefix, or an extended cyclic prefix.

Example 4: The method of any of examples 1 through 3, wherein the one or more timing offsets includes a first timing offset and a second timing offset, wherein the first timing offset comprises a first slot offset and a second slot offset, and wherein the second timing offset comprises a third slot offset.

Example 5: The method of example 4, wherein the UE receives the response message using a physical downlink control channel (PDCCH) and a physical downlink shared channel (PDSCH), and wherein the response message indicates a value of the third slot offset in at least one of a lookup table preconfigured by a network for the UE, in a downlink control information (DCI) received on the physical downlink control channel (PDCCH) as part of the random access procedure, or in a media access control (MAC) header, a MAC subheader, or a MAC sub protocol data unit (subPDU) received on the physical downlink shared channel (PDSCH) as part of the random access procedure.

Example 6: A method of wireless communication for a user equipment (UE), comprising: transmitting a first message or a third message of a random access procedure to a serving base station, the first message or the third message including a request for timeline relaxation for transmission of an acknowledgment message in the random access procedure; receiving a second message or a fourth message of the random access procedure from the serving base station, the second message or the fourth message indicating a timing offset corresponding to the timeline relaxation; and transmitting the acknowledgement message on a physical uplink control channel (PUCCH) or a physical uplink shared channel (PUSCH) in response to the second message or fourth message of the random access procedure based on the timing offset.

Example 7: The method of example 6, wherein the timing offset is indicated as a number of slots using one or more bits of a downlink control information (DCI) format and a plurality of bits allocated to a physical downlink shared channel (PDSCH) to hybrid automatic repeat request (HARQ) feedback (FB) timing indicator in the DCI format.

Example 8: The method of example 7, wherein the one or more bits of the DCI format and the plurality of bits allocated to the PDSCH to HARQ FB timing indicator in the DCI format form a 5-bit value.

Example 9: The method of example 8, wherein the 5-bit value indicates a value for the timeline relaxation that is within a range of one to 32 slots.

Example 10: The method of example 7, wherein the timing offset is indicated by a group-specific slot offset and a UE-specific slot offset, wherein the group-specific slot offset is indicated as a number of slots using one or more UE group-specific bits carried by downlink control information (DCI) of the PDCCH or by a common media access control (MAC) header of the PDSCH, and the UE-specific slot offset is indicated as one or more UE-specific bits carried by downlink control information (DCI) of the PDCCH, or by a MAC subheader or a MAC sub protocol data unit (subPDU) of the PDSCH, and wherein the PDCCH and the PDSCH are mapped to the response message.

Example 11: The method of example 6, wherein the second message or the fourth message carries a success random access response (SuccessRAR) with respect to the first message or the third message of the random access procedure.

Example 12: A method of wireless communication for a user equipment (UE), comprising: transmitting a message of a random access procedure to a serving base station, the message including a request for a physical uplink control channel (PUCCH) coverage enhancement or a physical uplink shared channel (PUSCH) coverage enhancement; receiving, in response to the message, a response message of the random access procedure from the serving base station, the response message indicating at least one of a PUCCH format from an augmented lookup table (LUT) for PUCCH resource configuration, a PUCCH repetition level, or a frequency hopping pattern; and transmitting a PUCCH signal based on at least one of the PUCCH format from the augmented lookup table (LUT) for PUCCH resource configuration, the PUCCH repetition level, or the frequency hopping pattern, or transmitting a PUSCH signal based on at least a PUSCH repetition level or the frequency hopping pattern.

Example 13: The method of example 12, wherein at least one of the PUCCH format from the augmented LUT, the PUCCH repetition level or PUSCH repetition level or the frequency hopping pattern is indicated using a plurality of bits, wherein one or more of the plurality of bits are bits of a downlink control information (DCI) format.

Example 14: The method of example 12, wherein at least one of the PUCCH format from the augmented LUT, the PUCCH repetition level or the PUSCH repetition level or the frequency hopping pattern is indicated using one or more bits mapped to at least a media access control (MAC) header, a MAC subheader, or a MAC sub protocol data unit (subPDU) in the response message.

Example 15: The method of example 12, wherein at least one of the PUCCH format from the augmented LUT, the PUCCH repetition level or the PUSCH repetition level or the frequency hopping pattern is indicated using a plurality of bits, wherein the plurality of bits is a combination of at least one or more bits of a downlink control information (DCI) format and one or more bits mapped to at least a media access control (MAC) header, a MAC subheader, or a MAC sub protocol data unit (subPDU) in the response message.

Example 16: A user equipment (UE) for wireless communication, comprising: a processor; a transceiver communicatively coupled to the at least one processor; and a memory communicatively coupled to the at least one processor, wherein the processor is configured to perform a method of any one of examples 1 through 15.

Example 17: An apparatus for wireless communication comprising at least one means for performing a method of any one of the examples 1 through 15.

Example 18: A non-transitory computer-readable medium storing computer-executable code at a user equipment (UE), the code comprising instructions executable by a processor to perform a method of any one of examples 1 through 15.

Example 19: A method of wireless communication for a base station, comprising: receiving a message from a user equipment (UE), the message including a request for timeline relaxation for a subsequent message to be received from the UE, the message and the subsequent message being associated with a random access procedure; transmitting a response message to the UE, the response message being associated with the random access procedure and indicating one or more timing offsets corresponding to the timeline relaxation; and receiving the subsequent message from the UE based on the one or more timing offsets, wherein the subsequent message acknowledges the response message.

Example 20: The method of example 19, wherein the one or more timing offsets includes a first timing offset comprising a first slot offset and a second slot offset, wherein a value of the first slot offset is obtained from a first set of lookup tables (LUTs) based on at least the request for the timeline relaxation, a physical uplink shared channel (PUSCH) mapping type or a PUSCH numerology in an active uplink (UL) bandwidth part (BWP), and wherein a value of the second slot offset is obtained from a second set of lookup tables (LUTs) based on at least the request for the timeline relaxation or the PUSCH numerology in the active uplink (UL) bandwidth part (BWP).

Example 21: The method of example 20, wherein the PUSCH mapping type is a type of predetermined standard-based mapping, and wherein the PUSCH numerology is based on a subcarrier spacing (SCS) value, a normal cyclic prefix, or an extended cyclic prefix.

Example 22: The method of any of examples 19 through 21, wherein the one or more timing offsets includes a first timing offset and a second timing offset, wherein the first timing offset comprises a first slot offset and a second slot offset, and wherein the second timing offset comprises a third slot offset.

Example 23: The method of example 22, wherein the base station transmits the response message using a physical downlink control channel (PDCCH) and a physical downlink shared channel (PDSCH), and wherein the response message indicates a value of the third slot offset in at least one of a lookup table preconfigured by a network for the UE, in a downlink control information (DCI) transmitted on the physical downlink control channel (PDCCH) as part of the random access procedure, or in a media access control (IAC) header, a MAC subheader, or a IAC sub protocol data unit (subPDU) transmitted on the physical downlink shared channel (PDSCH) as part of the random access procedure.

Example 24: A method of wireless communication for a base station, comprising: receiving a first message or a third message of a random access procedure from a user equipment, the first message or the third message including a request for timeline relaxation for reception of an acknowledgment message in the random access procedure, transmitting a second message or a fourth message of the random access procedure to the user equipment, the second message or the fourth message indicating a timing offset corresponding to the timeline relaxation, and receiving an acknowledgement message on a physical uplink control channel (PUCCH) or a physical uplink shared channel (PUSCH) for the second message or fourth message of the random access procedure based on the timing offset.

Example 25: The method of example 24, wherein the timing offset is indicated as a number of slots using one or more bits of a downlink control information (DCI) format and a plurality of bits allocated to a physical downlink shared channel (PDSCH) to hybrid automatic repeat request (HARQ) feedback (FB) timing indicator in the DCI format.

Example 26: The method of example 25, wherein the one or more bits of the DCI format and the plurality of bits allocated to the PDSCH to HARQ FB timing indicator in the DCI format form a 5-bit value.

Example 27: The method of example 26, wherein the 5-bit value indicates a value for the timeline relaxation that is within a range of one to 32 slots.

Example 28: The method of example 25, wherein the timing offset is indicated by a group-specific slot offset and a UE-specific slot offset, wherein the group-specific slot offset is indicated as a number of slots using one or more UE group-specific bits carried by downlink control information (DCI) of the PDCCH or by a common media access control (MAC) header of the PDSCH, and the UE-specific slot offset is indicated as one or more UE-specific bits carried by downlink control information (DCI) of the PDCCH, or by a MAC subheader or a MAC sub protocol data unit (subPDU) of the PDSCH, and wherein the PDCCH and the PDSCH are mapped to the response message.

Example 29: The method of example 24, wherein the second message or the fourth message carries a success random access response (SuccessRAR) with respect to the first message or the third message of the random access procedure.

Example 30: A method of wireless communication for a base station, comprising: receiving a message of a random access procedure from a user equipment, the message including a request for a physical uplink control channel (PUCCH) coverage enhancement or a physical uplink shared channel (PUSCH) coverage enhancement, transmitting, in response to the message, a response message of the random access procedure to the user equipment, the response message indicating at least one of a PUCCH format from an augmented lookup table (LUT) for PUCCH resource configuration, a PUCCH repetition level, or a frequency hopping pattern, and receiving a PUCCH signal based on at least one of the PUCCH format from the augmented lookup table (LUT) for PUCCH resource configuration, the PUCCH repetition level, or the frequency hopping pattern, or receiving a PUSCH signal based on at least a PUSCH repetition level or the frequency hopping pattern.

Example 31: The method of example 30, wherein at least one of the PUCCH format from the augmented LUT, the PUCCH repetition level or PUSCH repetition level or the frequency hopping pattern is indicated using a plurality of bits, wherein one or more of the plurality of bits are bits of a downlink control information (DCI) format.

Example 32: The method of example 30, wherein at least one of the PUCCH format from the augmented LUT, the PUCCH repetition level or the PUSCH repetition level or the frequency hopping pattern is indicated using one or more bits mapped to at least a media access control (MAC) header, a MAC subheader, or a MAC sub protocol data unit (subPDU) in the response message.

Example 33: The method of example 30, wherein at least one of the PUCCH format from the augmented LUT, the PUCCH repetition level or the PUSCH repetition level or the frequency hopping pattern is indicated using a plurality of bits, wherein the plurality of bits is a combination of at least one or more bits of a downlink control information (DCI) format and one or more bits mapped to at least a media access control (MAC) header, a MAC subheader, or a MAC sub protocol data unit (subPDU) in the response message.

Example 34: A base station for wireless communication, comprising: a processor; a transceiver communicatively coupled to the at least one processor; and a memory communicatively coupled to the at least one processor, wherein the processor is configured to perform a method of any one of examples 19 through 33.

Example 35: An apparatus for wireless communication comprising at least one means for performing a method of any one of the examples 19 through 33.

Example 36: A non-transitory computer-readable medium storing computer-executable code at a base station, the code comprising instructions executable by a processor to perform a method of any one of examples 19 through 33.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-22 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication for a user equipment (UE), comprising:
    transmitting a message to a serving base station, the message including a request for timeline relaxation for transmission of a subsequent message, the message and the subsequent message being associated with a random access procedure;
    receiving a response message from the serving base station, the response message being associated with the random access procedure and indicating one or more timing offsets corresponding to the timeline relaxation, wherein the one or more timing offsets includes at least one slot offset based on at least one lookup table (LUT); and
    transmitting the subsequent message to the serving base station based on the one or more timing offsets indicated by the serving base station, wherein the subsequent message acknowledges the response message.

2. The method of claim 1, wherein the one or more timing offsets includes a first timing offset comprising a first slot offset and a second slot offset, wherein a value of the first slot offset is obtained from a first set of lookup tables (LUTs) based on at least the request for the timeline relaxation, a physical uplink shared channel (PUSCH) mapping type or a PUSCH numerology in an active uplink (UL) bandwidth part (BWP), and wherein a value of the second slot offset is obtained from a second set of lookup tables (LUTs) based on at least the request for the timeline relaxation or the PUSCH numerology in the active uplink (UL) bandwidth part (BWP).

3. The method of claim 2, wherein the PUSCH mapping type is a type of predetermined standard-based mapping, and wherein the PUSCH numerology is based on a subcarrier spacing (SCS) value, a normal cyclic prefix, or an extended cyclic prefix.

4. The method of claim 1, wherein the one or more timing offsets includes a first timing offset and a second timing offset, wherein the first timing offset comprises a first slot offset and a second slot offset, and wherein the second timing offset comprises a third slot offset.

5. The method of claim 4, wherein the UE receives the response message using a physical downlink control channel (PDCCH) and a physical downlink shared channel (PDSCH), and wherein the response message indicates a value of the third slot offset in at least one of a lookup table preconfigured by a network for the UE, in a downlink control information (DCI) received on the physical downlink control channel (PDCCH) as part of the random access procedure, or in a media access control (MAC) header, a MAC subheader, or a MAC sub protocol data unit (subPDU) received on the physical downlink shared channel (PDSCH) as part of the random access procedure.

6. A method of wireless communication for a user equipment (UE), comprising:
transmitting a first message or a third message of a random access procedure to a serving base station, the first message or the third message including a request for timeline relaxation for transmission of an acknowledgment message in the random access procedure;
receiving a second message or a fourth message of the random access procedure from the serving base station, the second message or the fourth message indicating a timing offset corresponding to the timeline relaxation, wherein the timing offset is indicated as a number of slots using one or more bits of a downlink control information (DCI) format and a plurality of bits allocated to a physical downlink shared channel (PDSCH) to hybrid automatic repeat request (HARQ) feedback (FB) timing indicator in the DCI format; and
transmitting the acknowledgement message on a physical uplink control channel (PUCCH) or a physical uplink shared channel (PUSCH) in response to the second message or fourth message of the random access procedure based on the timing offset.

7. The method of claim 6, wherein the one or more bits of the DCI format and the plurality of bits allocated to the PDSCH to HARQ FB timing indicator in the DCI format form a 5-bit value.

8. The method of claim 7, wherein the 5-bit value indicates a value for the timeline relaxation that is within a range of one to 32 slots.

9. The method of claim 6, wherein:
the timing offset is indicated by a group-specific slot offset and a UE-specific slot offset, wherein the group-specific slot offset is indicated as a number of slots using one or more UE group-specific bits carried by downlink control information (DCI) of a physical downlink control channel (PDCCH) or by a common media access control (MAC) header of the PDSCH, and
the UE-specific slot offset is indicated as one or more UE-specific bits carried by downlink control information (DCI) of the PDCCH, or by a MAC subheader or a MAC sub protocol data unit (subPDU) of the PDSCH, and
wherein the PDCCH and the PDSCH are mapped to the response message.

10. The method of claim 6, wherein the second message or the fourth message carries a success random access response (SuccessRAR) with respect to the first message or the third message of the random access procedure.

11. An apparatus for wireless communication, comprising:
at least one processor;
a transceiver communicatively coupled to the at least one processor; and
a memory communicatively coupled to the at least one processor,
wherein the at least one processor is configured to:
transmit a message to a serving base station, the message including a request for timeline relaxation for transmission of a subsequent message, the message and the subsequent message being associated with a random access procedure;
receive a response message from the serving base station, the response message being associated with the random access procedure and indicating one or more timing offsets corresponding to the timeline relaxation, wherein the one or more timing offsets includes at least one slot offset based on at least one lookup table (LUT); and
transmit the subsequent message to the serving base station based on the one or more timing offsets indicated by the serving base station, wherein the subsequent message acknowledges the response message.

12. The apparatus of claim 11, wherein the one or more timing offsets includes a first timing offset comprising a first slot offset and a second slot offset, wherein a value of the first slot offset is obtained from a first set of lookup tables (LUTs) based on at least the request for the timeline relaxation, a physical uplink shared channel (PUSCH) mapping type or a PUSCH numerology in an active uplink (UL) bandwidth part (BWP), and wherein a value of the second slot offset is obtained from a second set of lookup tables (LUTs) based on at least the request for the timeline relaxation or the PUSCH numerology in the active uplink (UL) bandwidth part (BWP).

13. The apparatus of claim 12, wherein the PUSCH mapping type is a type of predetermined standard-based mapping, and wherein the PUSCH numerology is based on a subcarrier spacing (SCS) value, a normal cyclic prefix, or an extended cyclic prefix.

14. The apparatus of claim 11, wherein the one or more timing offsets includes a first timing offset and a second timing offset, wherein the first timing offset comprises a first slot offset and a second slot offset, and wherein the second timing offset comprises a third slot offset.

15. The apparatus of claim 14, wherein the apparatus receives the response message using a physical downlink control channel (PDCCH) and a physical downlink shared channel (PDSCH), and wherein the response message indicates a value of the third slot offset in at least one of a lookup table preconfigured by a network for the apparatus, in a downlink control information (DCI) received on the physical downlink control channel (PDCCH) as part of the random access procedure, or in a media access control (MAC) header, a MAC subheader, or a MAC sub protocol data unit (subPDU) received on the physical downlink shared channel (PDSCH) as part of the random access procedure.

* * * * *